United States Patent [19]
Mizuuchi et al.

[11] Patent Number: 5,506,722
[45] Date of Patent: Apr. 9, 1996

[54] OPTICAL WAVELENGTH CONVERTING DEVICE FOR CONVERTING FUNDAMENTAL WAVES INTO HARMONIC WAVES AND SHORTER WAVELENGTH COHERENT LIGHT GENERATING APPARATUS WITH THE DEVICE

[75] Inventors: Kiminori Mizuuchi; Kazuhisa Yamamoto; Hisanao Sato, all of Osaka, Japan

[73] Assignee: Mitsubishi Electric Industrial Co., Ltd., Osaka, Japan

[21] Appl. No.: 387,057

[22] Filed: Feb. 10, 1995

Related U.S. Application Data

[63] Continuation of Ser. No. 132,295, Oct. 16, 1993, abandoned.

[30] Foreign Application Priority Data

Oct. 7, 1992 [JP] Japan ..................................... 4-268388
Jan. 22, 1993 [JP] Japan ....................................... 5-8961

[51] Int. Cl.$^6$ ...................................................... G02F 1/37
[52] U.S. Cl. ........................ 359/332; 359/328; 385/122
[58] Field of Search .............................. 385/122; 372/21, 372/22; 359/326–332

[56] References Cited

U.S. PATENT DOCUMENTS

| | | | |
|---|---|---|---|
| 5,036,220 | 7/1991 | Byer et al. ................................ | 359/328 |
| 5,121,250 | 6/1992 | Shinozaki et al. ....................... | 359/328 |
| 5,157,754 | 10/1992 | Bierlein et al. ......................... | 385/122 |
| 5,170,460 | 12/1992 | Arvidsson et al. ................. | 359/326 X |
| 5,185,752 | 2/1993 | Welch et al. .............................. | 372/22 |
| 5,218,661 | 6/1993 | Droste et al. ........................... | 385/122 |
| 5,247,528 | 9/1993 | Shinozaki et al. ....................... | 372/22 |
| 5,274,727 | 12/1993 | Ito et al. .................................. | 385/122 |

FOREIGN PATENT DOCUMENTS

| | | |
|---|---|---|
| 5-27288 | 2/1993 | Japan . |
| 5-066440 | 3/1993 | Japan . |

OTHER PUBLICATIONS

Mizuuchi et al, "Characteristics Of Periodically Domain--Inverted LiTaO3", J. Appl. Phys., vol. 72, No. 11, Dec. 1992, pp. 5061–5069.

Mizuuchi et al, "Fabrication Of Periodic Domain Inversion In An X–Cut LiTaO3", Appl. Phys. Lett., vol. 62, No. 16, Apr. 1993, pp. 1860–1862.

Mizuuchi et al, "Highly Efficient Quasi–Phase–Matched Second–Harmonic Generation Using A First–Order Periodically Domain–Inverted LiTaO3 Waveguide", Appl. Phys. Lett., vol. 60, No. 11, Mar. 1992, pp. 1283–1285.

Shinozaki et al, "Conversion Efficiency Enhancement Technique For A Quasiphase Matched Second–Harmonic Generation Device", Jap. J. Appl. Phys. Part 1, vol. 31, No. 7, Jul. 1992, pp. 2104–2108.

Yamamoto et al, "Blue–Light Generation By Frequency Doubling Of A Laser Diode In A Periodically Domain–Inverted LiTaO3 Waveguide", IEEE Photonic Tech. Lett., vol. 4, No. 5, May 1992, pp. 435–437.

Yamamoto et al, "Milliwatt–Order Blue–Light Generation In A Periodically Domain–Inverted LiTaO3 Waveguide", Optics Letters, vol. 6, No. 15, Aug. 1991, pp. 1156–1158.

Primary Examiner—John D. Lee
Attorney, Agent, or Firm—Lowe, Price, LeBlanc & Becker

[57] ABSTRACT

An optical wavelength converting device is provided with a $LiTaO_3$ substrate, a plurality of inverted-polarization layers periodically arranged in an upper surface of the $LiTaO_3$ substrate, and an optical waveguide crossing the inverted-polarization layers. The upper surface of the $LiTaO_3$ substrate is directed toward a −X-crystal axis direction. The inverted-polarization layers are formed by exchanging $Ta^+$ ions of the $LiTaO_3$ substrate for $H^+$ ions, and an extending direction of each inverted-polarization layer is inclined at an angle of θ degrees ($6 \leq \theta \leq 174$) to the +C-crystal axis direction toward a −Y-crystal axis direction. The optical waveguide is formed by exchanging $Ta^+$ ions of the $LiTaO_3$ substrate and the inverted-polarization layers for $H^+$ ions to set a refractive index of the optical waveguide higher than that of the $LiTaO_3$ substrate. The optical waveguide extends in a +Y-crystal axis direction. Fundamental waves polarized in a transverse electric mode induce electric field directed in ±Y-crystal axis directions and are converted into second harmonic waves in the optical waveguide.

31 Claims, 21 Drawing Sheets

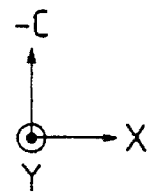
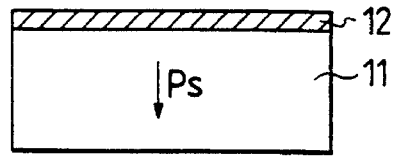
FIG. 1A
PRIOR ART
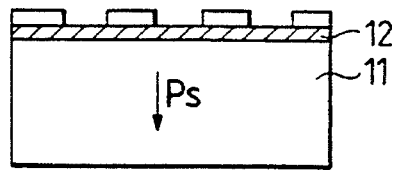
FIG. 1B
PRIOR ART
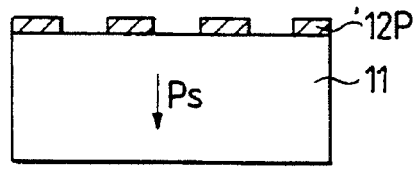
FIG. 1C
PRIOR ART
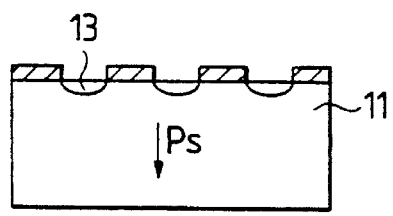
FIG. 1D
PRIOR ART
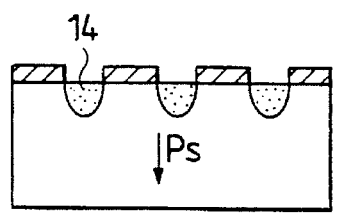
FIG. 1E
PRIOR ART

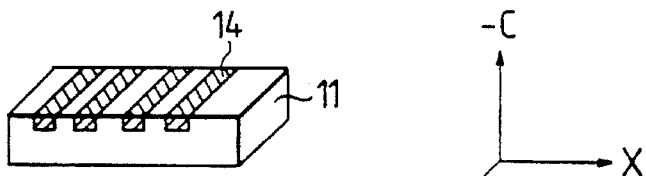
*FIG. 1F PRIOR ART*
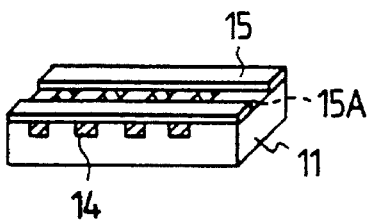
*FIG. 1G PRIOR ART*
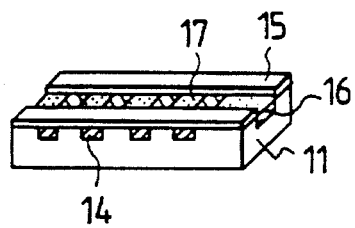
*FIG. 1H PRIOR ART*
*FIG. 2 PRIOR ART*
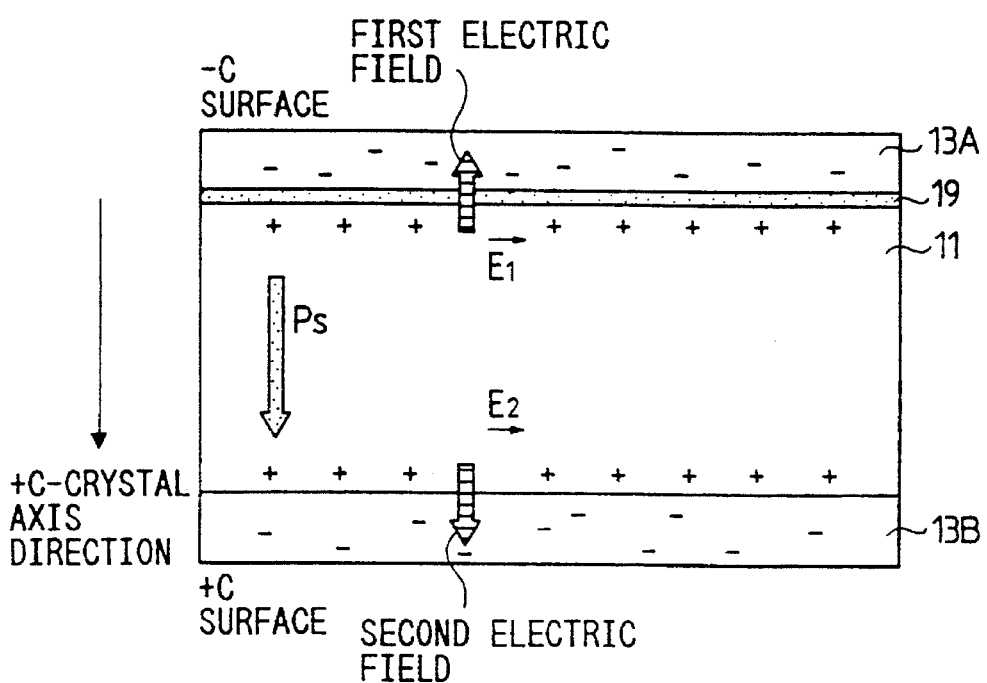

FIG. 3(a) PRIOR ART
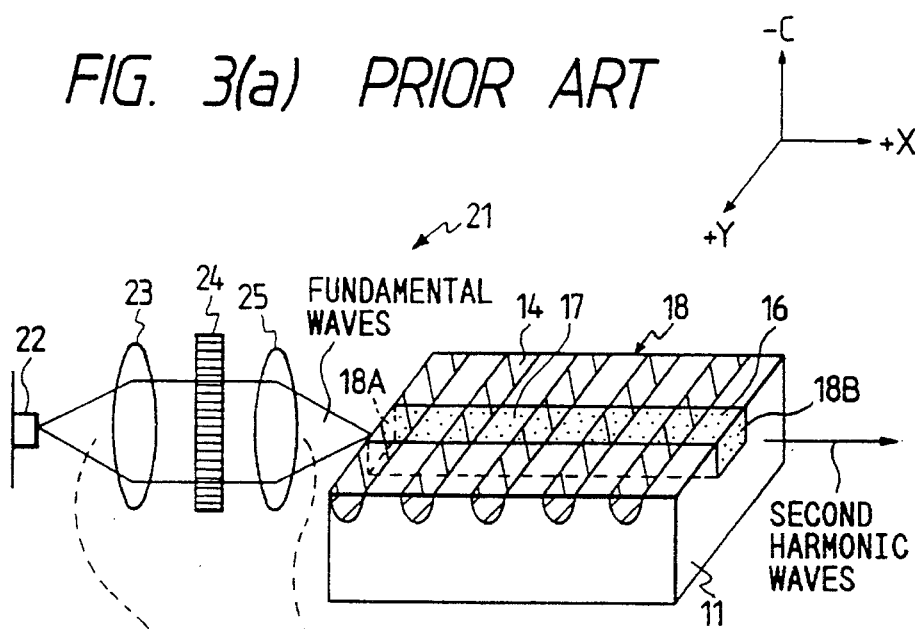
FIG. 3(b) PRIOR ART
FIG. 4 PRIOR ART
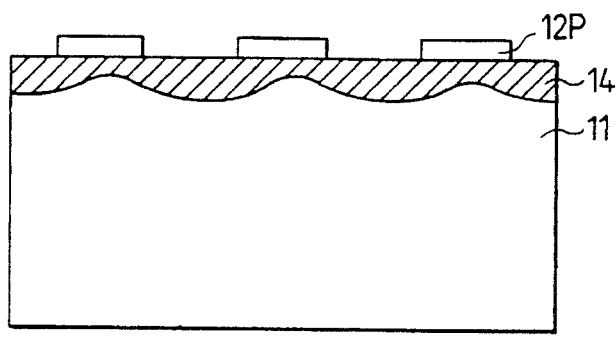

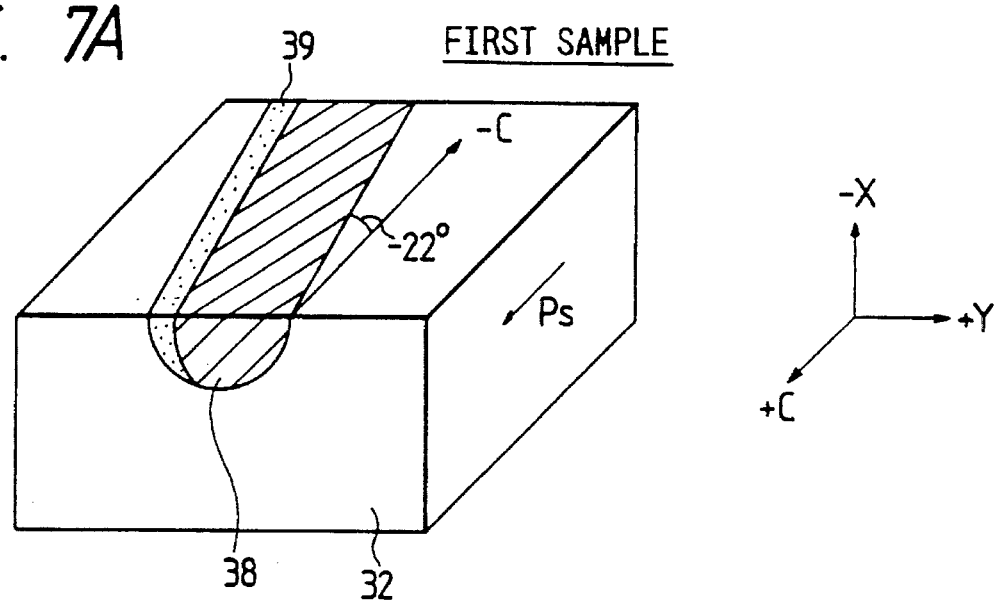
FIG. 7A  FIRST SAMPLE
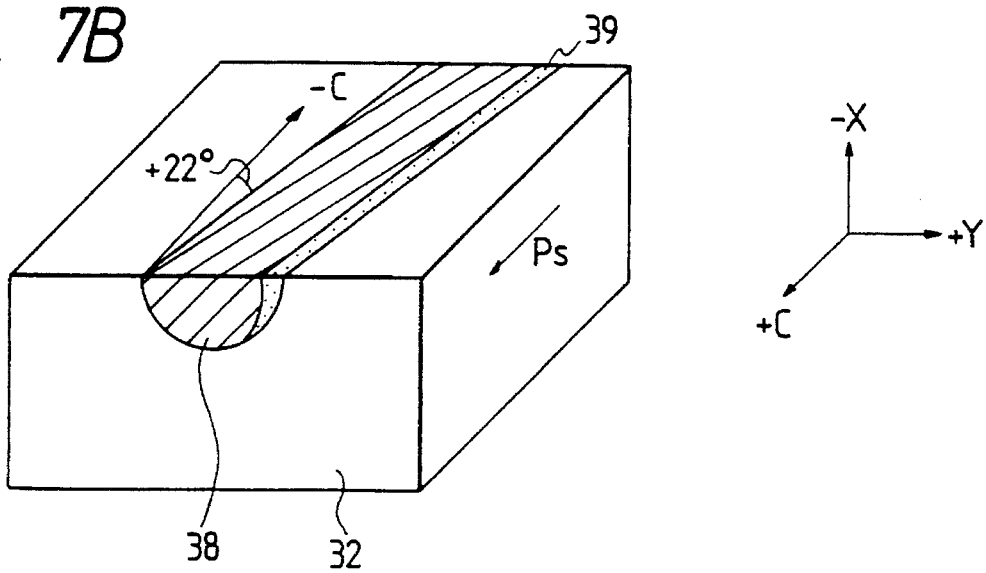
FIG. 7B  SECOND SAMPLE

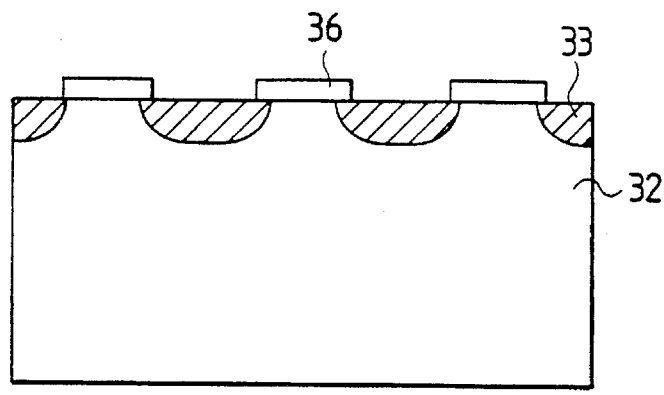
FIG. 10A
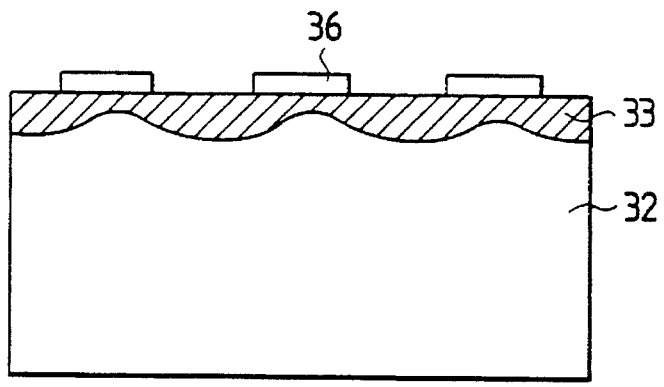
FIG. 10B
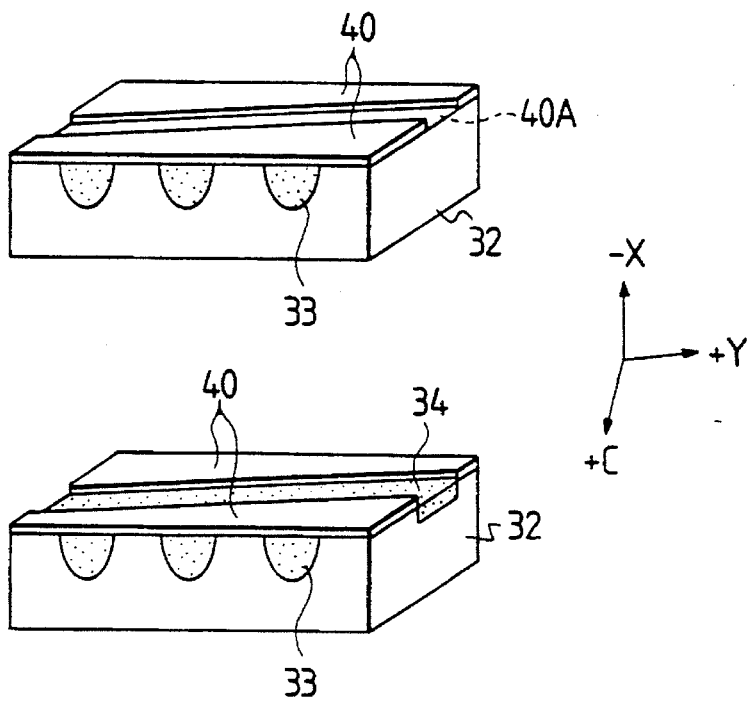
FIG. 11A
FIG. 11B

| SAMPLE NO. | OUTGOING POWER (mW) OF FUNDAMENTAL WAVES | OUTGOING POWER (mW) OF SECOND HARMONIC WAVES |
|---|---|---|
| SAMPLE A | 20 | 1 |
| SAMPLE B | 10 | 0.5 |
| SAMPLE C | 20 | 0 |

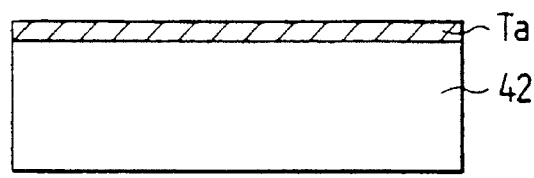
FIG. 16A
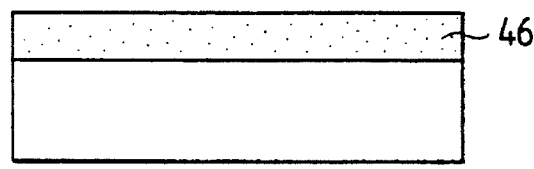
FIG. 16B
FIG. 17
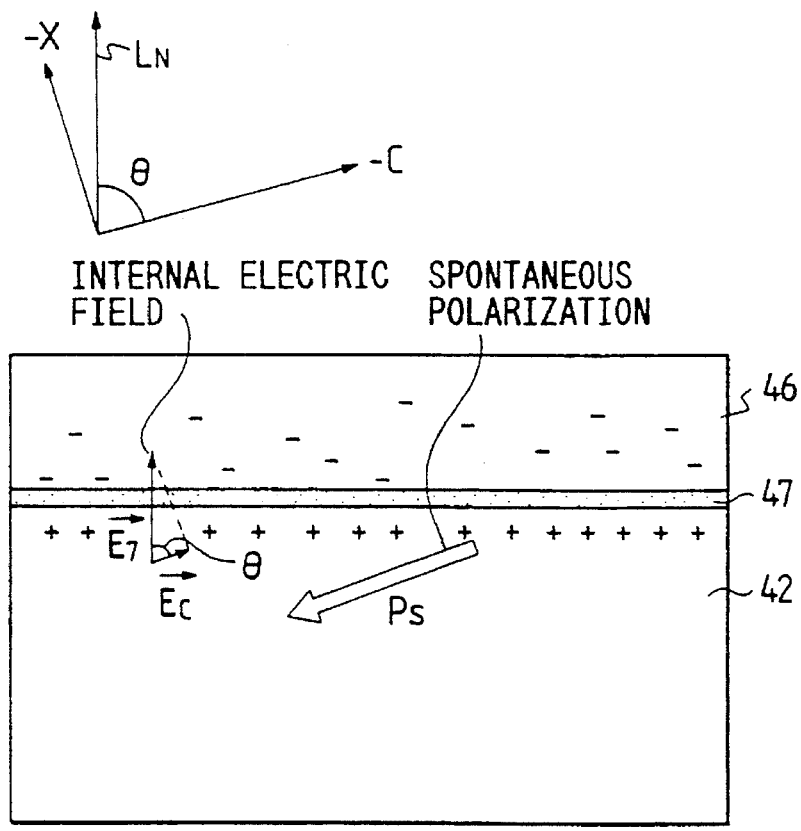

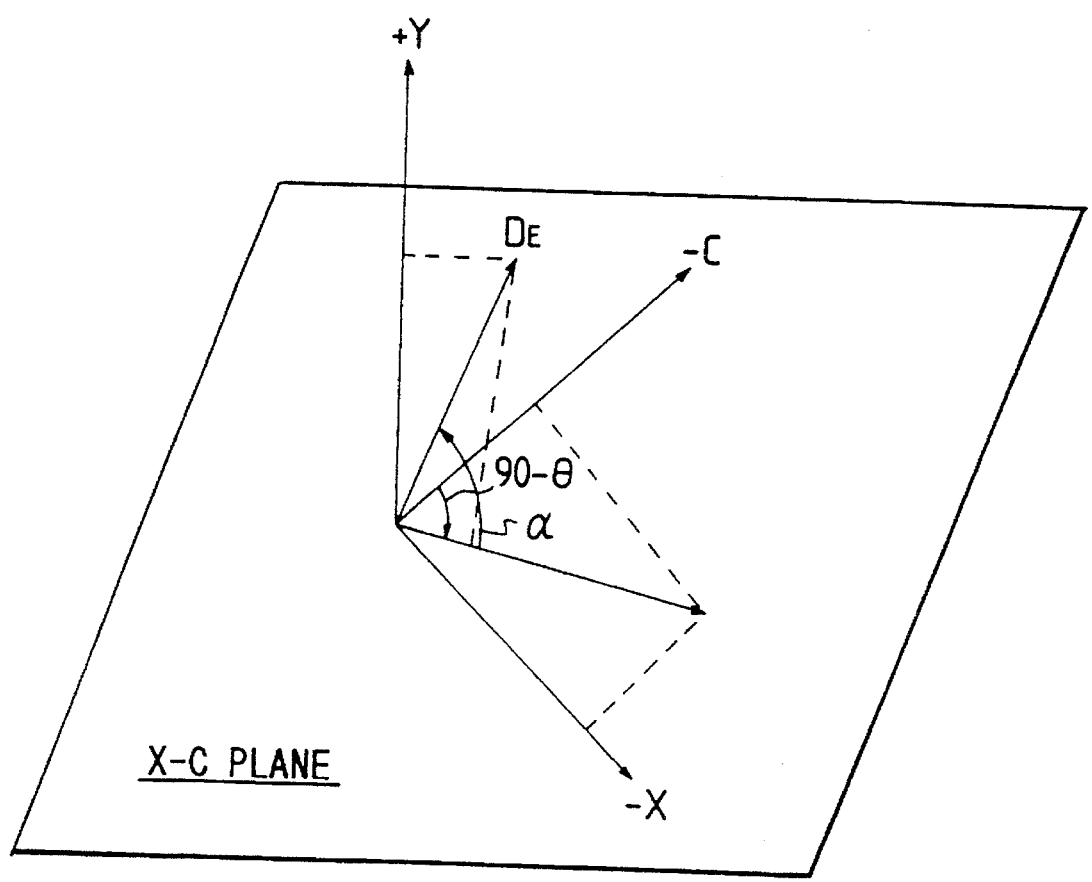

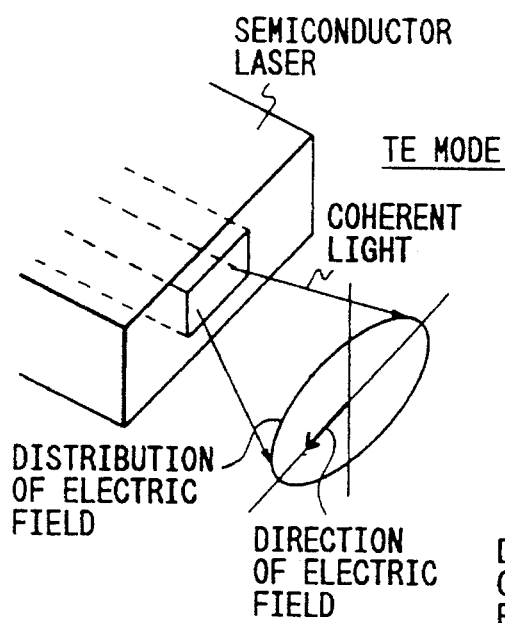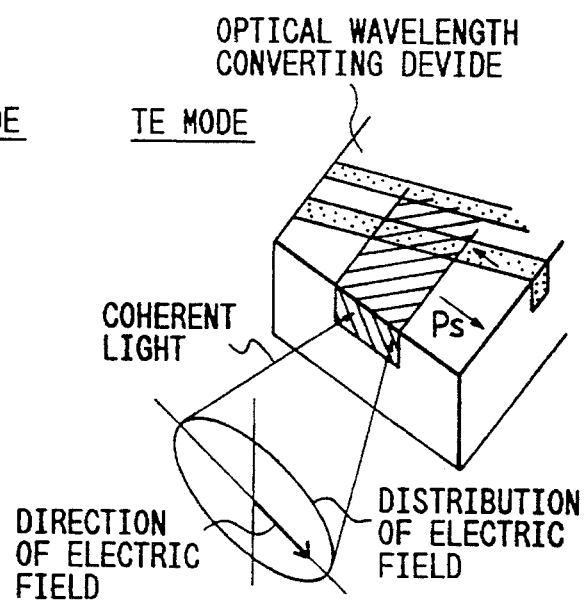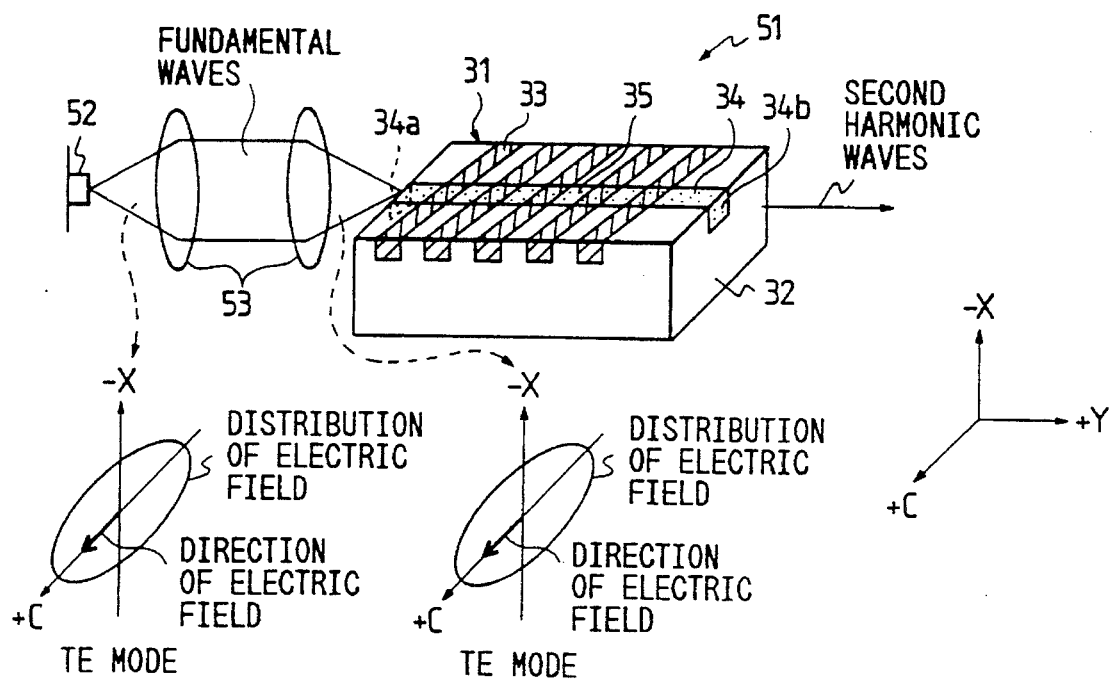

DIRECTION OF  ELECTRIC
POLARIZATION  FIELD

DIRECTION OF  ELECTRIC
POLARIZATION  FIELD 5,506,722

OPTICAL WAVELENGTH CONVERTING DEVICE FOR CONVERTING FUNDAMENTAL WAVES INTO HARMONIC WAVES AND SHORTER WAVELENGTH COHERENT LIGHT GENERATING APPARATUS WITH THE DEVICE

This is a continuation of application Ser. No. 08/132,295, filed Oct. 6, 1993, now abandoned.

BACKGROUND OF THE INVENTION

1. Field of the Invention

The present invention relates generally to an optical wavelength converting device for providing a coherent light source required in a photo information processing field and a photo applied measuring control field and a manufacturing method of the device, and more particularly to a device for converting fundamental waves into second harmonic waves to generate shorter wavelength light and a manufacturing method of the device. Also, the present invention relates to a shorter wavelength coherent light generating apparatus with the device.

2. Description of the Related Art

A ferroelectric substance having a plurality of inverted-polarization layers periodically arranged is formed by forcibly inverting spontaneous polarization of the ferroelectric substance. The ferroelectric substance having the inverted-polarization layers have been utilized as an optical frequency modulator utilizing surface acoustic waves and an optical wavelength converting device utilizing non-linear polarization inversion of a non-linear optic substance. Particularly, in cases where non-linear polarization of the non-linear optic substance is periodically inverted to produce alternate rows of non-linear polarization layers and non-linear inverted-polarization layers, fundamental waves can be efficiently converted into second harmonic waves by transmitting the fundamental waves through the alternate rows. Therefore, a small-sized shorter wavelength coherent light generating apparatus can be manufactured by combining a semiconductor laser and the non-linear optical substance to transmit coherent light radiated from the semiconductor laser through the alternate rows of the non-linear optical substance. Because the small-sized shorter wavelength coherent light generating apparatus is useful for a printing field, a optical information processing field, and an optical applied measuring control field, the research of polarization inversion in the non-linear optical substance has been enthusiastically performed.

2.1. Previously Proposed Art

A conventional manufacturing method of inverted-polarization layers periodically arranged in a $LiTaO_3$ substrate has been proposed in Japanese Patent Application No. 301667 of 1991 which was laid open to public inspection on Feb. 5, 1993 under Provisional Publication No. 27288/93 (H5-27288). In J.P.A. 301667, a plurality of proton ($H^+$) exchange layers are periodically arranged in a $-C$ lattice plane of a $LiTaO_3$ substrate according to a selective proton exchange method. Thereafter, the proton exchange layers are rapidly heated according to an infrared heating method and are changed to inverted-polarization layers. The conventional manufacturing method is described with reference to FIGS. 1A to 1E in detail.

FIGS. 1A to 1E are cross sectional views showing a conventional manufacturing method of a conventional optical wavelength converting device in which inverted-polarization layers and non-inverted polarization layers are periodically arranged in an upper side of $LiTaO_3$ substrate, and FIGS. 1F to 1H are diagonal views showing the conventional manufacturing method.

As is well known, $LiTaO_3$ crystal has X-, Y-, and C-crystal axes, and a spontaneous polarization of the $LiTaO_3$ crystal is directed in a +C-crystal axis direction of the C-crystal axis.

As shown in FIG. 1A, a $LiTaO_3$ substrate 11 having a $-C$ lattice plane on its upper surface is prepared. The $LiTaO_3$ substrate 11 is formed by cutting out $LiTaO_3$ crystal in a perpendicular direction to the C-crystal axis defined as a crystal orientation [001], and the upper surface of the $LiTaO_3$ substrate 11 is directed towards a $-C$-crystal axis direction. Therefore, the $-C$ lattice plane is defined as $(00\overline{1})$ plane in Miller indices. Also, a spontaneous polarization Ps of the $LiTaO_3$ substrate 11 is directed in a lower direction (or +C-crystal axis direction). Thereafter, Ta atoms are deposited on the upper surface region of the $LiTaO_3$ substrate 11 according to a sputtering method to produce a Ta mask 12 at a thickness of 30 nm.

Thereafter, a periodic pattern is drawn on the Ta mask 12 according to a lithography process as shown in FIG. 1B, and the Ta mask 12 is etched in the periodic pattern according to a dry etching process as shown in FIG. 1C. Therefore, patterned Ta masks 12P are periodically arranged on the $LiTaO_3$ substrate 11 at regular intervals.

Thereafter, as shown in FIG. 1D, the $LiTaO_3$ substrate 11 is immersed in a pyrophosphoric acid ($H_4P_2O_7$) solution to periodically form a plurality of proton exchange layers 13 in the $LiTaO_3$ substrate 11 not covered with the Ta masks 12P according to a first proton exchange process. In detail, a part of $Li^+$ ions of the $LiTaO_3$ substrate 11 are exchanged for $H^+$ ions of the pyrophosphoric acid solution so that the proton exchange layers 13 made of $H_{(1-x)}Li_xTaO_3$ are periodically formed.

Thereafter, the $LiTaO_3$ substrate 11 with the proton exchange Layers 13 is heated up at a rising rate of about 10° C./second according to an infrared heating method. Thereafter, the thermal processing of the proton exchange layers 13 are continued at a temperature of 450° C. Therefore, as shown in FIG. 1E, the $H^+$ ions in the proton exchange layers 13 are thermally diffused into the $LiTaO_3$ substrate 11 at a prescribed thermal diffusion speed, and the spontaneous polarization Ps directed in the lower direction is inverted to an upper direction in a region thermally diffused by the $H^+$ ions to form inverted-polarization layers 14. Thereafter, the Ta masks 12P is taken off as shown in FIG. 1F.

Thereafter, Ta material is deposited on the $LiTaO_3$ substrate 11 with the inverted-polarization layers 14 and is patterned to form a Ta film 15 having a slit 15A, as shown in FIG. 1G. Thereafter, the $LiTaO_3$ substrate 11 with the inverted-polarization layers 14 is immersed in the pyrophosphoric acid solution according to a second proton exchange process to change the $LiTaO_3$ substrate 11 and the inverted-polarization layers 14 not covered with the Ta film 15 to a high refractive index layer. Thereafter, the Ta film 15 is taken off, and the high refractive index layer is annealed. As a result, as shown in FIG. 1H, the high refractive index layer is changed to an optical waveguide 16 which is composed of alternate rows of the inverted-polarization layers 14 and non-inverted polarization layers 17 processed according to the second proton exchange process, and the manufacturing of a conventional optical wavelength converting device 18 is finished.

Next, a forming mechanism of the inverted-polarization layer 14 in the $LiTaO_3$ substrate 11 having the $-C$ lattice plane is described to simplify the apprehension of the present invention. The forming mechanism is made clear by inventors of the present invention and is classified to two steps. A first step of the forming mechanism is that an inverted-polarization kernel functioning as a seed of the inverted-polarization layer 14 is formed because an internal electric field is induced in an upper surface region of the LiTaO$_3$ substrate 11. A second step of the forming mechanism is that the inverted-polarization kernel is growing large to form the inverted-polarization layer 14.

The forming mechanism relating to the inducement of the internal electric field is described in detail with reference to FIG. 2.

When the LiTaO$_3$ substrate 11 is immersed in the pyrophosphoric acid (H$_4$P$_2$O$_7$) solution, Li$^+$ ions existing in +C and −C surface regions of the LiTaO$_3$ substrate 11 are exchanged for H$^+$ ions of the pyrophosphoric acid solution. Therefore, as shown in FIG. 2, an upper proton exchange layer 13A composed of H$_{(1-x)}$Li$_x$TaO$_3$ is formed in the −C surface region of the LiTaO$_3$ substrate 11, and a lower proton exchange layer 13B composed of H$_{(1-x)}$Li$_x$TaO$_3$ is formed in the +C surface region of the LiTaO$_3$ substrate 11. Thereafter, when the LiTaO$_3$ substrate 11 is heated at high temperature, the H$^+$ ions densified in the proton exchange layers 13A, 13B are thermally diffused into an internal portion of the LiTaO$_3$ substrate 11. Also, the Li$^+$ ions densified in the internal portion of the LiTaO$_3$ substrate 11 are thermally diffused into the proton exchange layers 13A, 13B. However, because the thermal diffusion speed of the H$^+$ ions is faster than that of the Li$^+$ ions, the proton exchange layers 13A, 13B are charged with negative electricity, and the internal portion of the LiTaO$_3$ substrate 11 is charged with positive electricity. Therefore, a first internal electric field E$_1$ directed in the −C-crystal axis direction is induced in a first boundary region between the first proton exchange layer 13A and the internal portion of the LiTaO$_3$ substrate 11, and a second internal electric field E$_2$ directed in the +C-crystal axis direction is induced in a second boundary region between the proton exchange layer 13B and the internal portion of the LiTaO$_3$ substrate 11.

In this case, because the direction of the second internal electric field E$_2$ is the same as that of the spontaneous polarization Ps of the LiTaO$_3$ substrate 11, the polarization of the second boundary region remain directed in the direction of the spontaneous polarization Ps. In contrast, because the direction of the first internal electric field E$_1$ is opposite to that of the spontaneous polarization Ps of the LiTaO$_3$ substrate 11, the polarization direction in the first boundary region is inverted so that an inverted-polarization kernel 19 is generated in the first boundary region. The direction of the polarization of the inverted-polarization kernel 19 is opposite to that of the spontaneous polarization Ps of the LiTaO$_3$ substrate 11. Thereafter, the inverted-polarization kernel 19 is growing large while the LiTaO$_3$ substrate 11 is heated at high temperature. Accordingly, the inverted-polarization layer 14 is produced in the upper surface region of the LiTaO$_3$ substrate 11.

2.2. Another Previously Proposed Art

Next, a conventional shorter wavelength coherent light generating apparatus is described.

To obtain a small-sized blue light source radiating at an output power of over 1 mW, a quasi-phase-matching type of optical wavelength converting device and a semiconductor laser are integrally formed to make a shorter wavelength coherent light generating apparatus as the small-sized blue light source (Yamamoto et. al. Optics Letters, Vol. 16, No. 15, 1156 (1991)).

FIG. 3(a) is a constitutional view schematically showing the conventional shorter wavelength coherent light generating apparatus proposed by Yamamoto.

As shown in FIG. 3(a), the conventional shorter wavelength coherent light generating apparatus 21 is provided with a semiconductor laser 22 for radiating coherent light consisting of fundamental waves of 870 nm wavelength, a collimator lens 23 for collimating the coherent light, a λ/2 polarizer 24 for rotating the polarization direction of the coherent light, a focusing lens 25 having a numerical aperture n=0.6 for converging the coherent light, and the optical wavelength converting device 18 for converting the fundamental waves of the coherent light focused on its incident end facet 18a into second harmonic waves of 435 nm wavelength.

In the above configuration, coherent light radiated from the semiconductor laser 22 is collimated by the collimator lens 23, and the polarization direction of the coherent light collimated is rotated by the λ/2 polarizer 24. That is, as shown in FIG. 3(b), a transverse electric mode (TE mode) of coherent light radiated from the semiconductor laser 22 is changed to a transverse magnetic mode (TM mode) of coherent light by the λ/2 polarizer 24.

In detail, the coherent light radiated from the semiconductor laser 22 in the TE mode is distributed in a elliptic shape to have a major axis of the elliptic distribution in parallel to the Y-crystal axis, and the electric field is directed in a direction of the major axis. Also, electric field induced by coherent light converged at the incident end facet 18A of the optical waveguide 16 in the TM mode is distributed in a elliptic shape to have a major axis of the elliptic distribution in parallel to a major side of the incident end facet 18A formed in a rectangular shape. Therefore, intensity of the coherent light received in the optical waveguide 16 is maximized. Also, the electric field is directed in a direction of a minor axis of the elliptic distribution to direct the electric field in parallel to the C-crystal axis.

The reason that the mode change is performed in the λ/2 polarizer 24 is as follows.

The coherent light radiated from the semiconductor laser 22 is generally polarized in the TE mode to enhance an oscillating efficiency of the coherent light in the semiconductor laser 22. In contrast, because a refractive index of the inverted polarization layers 14 in the ±C-crystal axis direction (or the upper and lower directions) is increased by the first and second proton exchange processes, electric field induced by coherent light transmitting through the optical waveguide 16 is required to be directed in parallel to the C-crystal axis, and the elliptic distribution of the electric field is required to have a major axis parallel to the Y-crystal axis. For example, in cases where the electric field is not directed in parallel to the C-crystal axis, the coherent light cannot couple to the optical waveguide 16. Also, in cases where the major axis of the elliptic distribution is not parallel to the Y-crystal axis, the intensity of the coherent light transmitting through the optical waveguide 16 is considerably reduced. Therefore, a TM mode of coherent light selectively transmit through the optical waveguide 16, and the other modes of coherent light cannot transmit through the optical waveguide 16. Therefore, the change of the TE mode to the TM mode is required of the coherent light by utilizing the λ/2 polarizer 24 to maximize the intensity of the coherent light in the optical waveguide 16.

Thereafter, the TM mode of coherent light is focused on the incident end facet 18a of the device 18. In the device 18, the TM mode of fundamental waves are converted into second harmonic waves on condition that a quasi-phase-matching condition formulated by an equation $\Lambda=\lambda_f/\{2*(N2\omega-N\omega)\}$ is satisfied. Here the symbol $\Lambda$ denotes regular intervals of the inverted-polarization layers 14, the symbol $\lambda_f$ denotes a wavelength of the fundamental waves, the symbol $N2\omega$ denotes an effective refractive index of the optical waveguide 16 for the second harmonic waves, and the symbol $N\omega$ denotes an effective refractive index of the optical waveguide 16 for the fundamental waves.

As a result, 48% of fundamental waves radiated from the semiconductor laser 22 transmit through the optical waveguide 29 of the device 18, and the second harmonic waves are radiated from the device 18 at an output power 1.3 mW.

2.3. PROBLEMS IS TO BE SOLVED BY THE INVENTION

Problems to be solved in the conventional manufacturing method of the conventional optical wavelength converting device 18 are initially described.

In the conventional manufacturing method, because the polarization of the LiTaO$_3$ substrate 11 is directed to the +C-crystal axis direction, the upper surface of the LiTaO$_3$ substrate 11 is set to the –C lattice plane of Miller indices to periodically form the inverted-polarization layers 14 according to the first and second proton exchange processes. Therefore, the conventional manufacturing method is limited to the utilization of the LiTaO$_3$ substrate 11 having the –C lattice plane. In this case, the thermal diffusion speed of the proton exchange layers 13 in a perpendicular direction to the C-crystal axis is more than 1.5 times that of the proton exchange layers 13 in the ±C-crystal axis directions. Therefore, when the proton exchange layers 13 are heated to form the inverted-polarization layers 14, the growth of the inverted-polarization layers 14 in its width direction (or an X-crystal axis direction) is faster than that of the inverted-polarization layers 14 in its depth direction (or +C-crystal axis direction). As a result, as shown in FIG. 4, the inverted-polarization layers 14 adjacent to each other are connected to each other.

Accordingly, the depth of the inverted-polarization layers 14 formed in the LiTaO$_3$ substrate 11 having the –C lattice plane is limited in cases where the inverted-polarization layers 14 are arranged at short intervals to satisfy the quasi-phase-matching condition.

Therefore, in cases where the optical wavelength converting device 18 manufactured according to the conventional manufacturing method is utilized to obtain blue light of which a wavelength ranges from 400 nm to 500 nm, a converting efficiency of the fundamental waves to the second harmonic waves having the wavelength ranges from 400 nm to 500 nm deteriorates because the regular intervals $\Lambda$ of the inverted-polarization layers 14 ranges from 3 µm to 5 µm to satisfy the quasi-phase-matching condition.

Next, problems to be solved in the conventional shorter wavelength coherent light generating apparatus 21 are described.

In the conventional apparatus 21, the coherent light radiated from the semiconductor laser 22 is incident on the optical wavelength converting device 18 manufactured by utilizing the LiTaO$_3$ substrate 11 having the –C lattice plane. In this case, the coherent light is radiated from the semiconductor laser 22 in the TE mode, and light transmitting through the optical waveguide 16 of the device 18 is limited to the coherent light polarized in the TM mode because the device 18 is manufactured by utilizing the LiTaO$_3$ substrate 11 having the –C lattice plane. Therefore, an optical mode changing element represented by the $\lambda/2$ polarizer 24 or a beam reshaping optical system such as a prism is required to efficiently couple the coherent light radiated from the semiconductor laser 22 to the optical wavelength converting device 18. Therefore, the configuration of the conventional apparatus 21 is complicated.

Also, in cases where a small-sized shorter wavelength coherent light generating apparatus is manufactured, the semiconductor laser 22 and the optical wavelength converting device 18 are required to be integrally formed without arranging any light converging optical system. Therefore, the intensity of the coherent light transmitting through the optical waveguide 16 of the device 18 is considerably reduced because of the mismatching of the TE and TM modes. As a result, the intensity of the second harmonic waves radiated from the device 18 considerably deteriorates.

SUMMARY OF THE INVENTION

A first object of the present invention is to provide, with due consideration to the drawbacks of such a conventional manufacturing method of a conventional optical wavelength converting device, a manufacturing method of an optical wavelength converting device in which a plurality of inverted-polarization layers are periodically arranged at short intervals in a non-linear optic substance such as LiTa$_{(1-x)}$Nb$_x$O$_3$ crystal on condition that fundamental waves are converted into second harmonic waves at high efficiency in the optical wavelength converting device. And the first object is to provide an optical wavelength converting device manufactured according to the above manufacturing method.

A second object is to provide a small-sized shorter wavelength coherent light generating apparatus in which fundamental waves are converted into second harmonic waves at high efficiency without any optical mode changing element.

The first object is achieved by the provision of an optical wavelength converting device, comprising:

a ferroelectric substrate having an upper surface of which a normal line is inclined to a C-crystal axis toward an X-Y crystalline plane defined as (001) crystalline plane in Miller indices, spontaneous polarization of the ferroelectric substrate being directed toward a +C-crystal axis direction of the C-crystal axis;

a plurality of inverted-polarization layers arranged at regular intervals in an upper surface region of the ferroelectric substrate, polarization of the inverted-polarization layers being directed toward a –C-crystal axis direction of the C-crystal axis, and the inverted-polarization layers being formed by exchanging positive ions included in the ferroelectric substrate for H$^+$ ions: and an optical waveguide crossing alternate rows of the inverted-polarization layers and the ferroelectric substrate positioned between the inverted-polarization layers, a part of fundamental waves transmitting through the optical waveguide being converted into second harmonic waves, and a refractive index of the optical waveguide being higher than that of the ferroelectric substrate to confine the fundamental and second harmonic waves in the optical waveguide.

In the above configuration, the inverted-polarization layers are formed by exchanging positive ions included in the ferroelectric substrate for $H^+$ ions. In detail, when the ferroelectric substrate covered with patterned mask is immersed into an acid solution such as phosphoric acid, portions of the surface region of the ferroelectric substrate not covered with the patterned mask are changed to proton exchange layers because positive ions included in the ferroelectric substrate are exchanged for $H^+$ ions included in the acid solution. Thereafter, the $H^+$ ions densely existing in the proton exchange layers are diffused into the ferroelectric substrate surrounding the proton exchange layers, and positive ions existing in the ferroelectric substrate are diffused into the proton exchange layers. In this case, because a diffusion speed of the $H^+$ ions is higher than that of the positive ions, the proton exchange layers are charged with negative electricity, and the ferroelectric substrate surrounding the proton exchange layers are charged with positive electricity. Therefore, electric field directed from the ferroelectric substrate to the proton exchange layers at right angles is induced in boundary regions between the ferroelectric substrate and the proton exchange layers. In this case, because the normal line of the surface of the ferroelectric substrate is inclined from the C-crystal axis to the X-Y crystalline plane, the direction of the electric field is not normal to that of the spontaneous polarization directed in the +C-crystal axis direction. Therefore, the electric field has a component directed to a −C-crystal axis direction, and an inverted-polarization kernel is formed by the component. The polarization of the inverted-polarization kernel is directed in the −C-crystal axis direction which is opposite to the direction of the spontaneous polarization. Thereafter, the exchange of the $Li^+$ ions and the $H^+$ ions is continued to grow the inverted-polarization kernel while changing the spontaneous polarization of the proton exchange layers to the inverted-polarization directed to the −C-crystal axis direction. In this case, because the normal line of the surface of the ferroelectric substrate is inclined from the C-crystal axis, the diffusion speed of the $Li^+$ and $H^+$ ions in a depth direction of the proton exchange layers is enhanced as compared with that in the ±C-crystal axis directions. Therefore, the inverted-polarization layers are finally formed by the growth of the inverted-polarization kernel at a high depth.

Thereafter, the optical waveguide is formed so as to cross alternate rows of the inverted-polarization layers and the ferroelectric substrate. In detail, the alternate rows are thermally processed to increase a refractive index of the alternate rows. Therefore, the optical waveguide having a high refractive index is formed.

Accordingly, when coherent light consisting of fundamental waves transmits through the optical waveguide, the fundamental waves can be converted into second harmonic waves at a high conversion efficiency because the inverted-polarization layers are formed deep.

Also, even though the regular intervals of the inverted-polarization layers are shortened to get second harmonic waves having a shorter wavelength, the inverted-polarization layers not connected to each other can be arranged in the ferroelectric substrate because the inverted-polarization layers are formed deep.

The first object is also achieved by the provision of an manufacturing method of an optical wavelength converting device, comprising the steps of:

preparing a ferroelectric substrate having an upper surface of which a normal line is inclined to a C-crystal axis toward an X-Y crystalline plane defined as (001) crystalline plane in Miller indices, spontaneous polarization of the ferroelectric substrate being directed toward a +C-crystal axis direction:

arranging first masks on the upper surface of the ferroelectric substrate at regular intervals;

immersing the ferroelectric substrate with the first masks in a phosphoric acid solution to exchange positive ions of the ferroelectric substrate not covered with the first masks for $H^+$ ions of the phosphoric acid solution, a plurality of proton exchange regions arranged at the regular intervals being formed in an upper region of the ferroelectric substrate not covered with the first masks;

thermally processing the ferroelectric substrate and the proton exchange regions to diffuse the $H^+$ ions densified in the proton exchange regions into the ferroelectric substrate at a first diffusion speed and diffuse heavy ions of the ferroelectric substrate into the proton exchange regions at a second diffusion speed lower than the first diffusion speed, the proton exchange regions being charged with negative electricity, the ferroelectric substrate surrounding the proton exchange regions being charged with positive electricity, and an electric field having a component directed in a −C-crystal axis direction being induced because of a difference in electricity between the proton exchange regions and the ferroelectric substrate to form inverted-polarization kernels having inverted polarization directed in the −C-crystal axis direction in boundary regions between the proton exchange regions and the ferroelectric substrate;

growing the inverted-polarization kernels by continuing to thermally process the ferroelectric substrate and the proton exchange regions, the proton exchange regions and the ferroelectric substrate positioned under the proton exchange regions being changed to a plurality of inverted-polarization regions arranged at the regular intervals of which inverted polarization is directed in the −C-crystal axis direction opposite to the C-crystal axis direction; and forming an optical waveguide which crosses alternate rows of the inverted-polarization layers and the ferroelectric substrate positioned between the inverted-polarization layers, fundamental waves transmitting through the alternate rows of the optical waveguide being converted into second harmonic waves, and a refractive index of the optical waveguide being higher than that of the ferroelectric substrate to confine the fundamental and second harmonic waves in the optical waveguide.

In the above steps, when the ferroelectric substrate and the proton exchange regions are thermally processed, an electric field directed from the ferroelectric substrate to each of the proton exchange regions is induced. In this case, because the normal line of the surface of the ferroelectric substrate is inclined from the C-crystal axis to the X-Y crystalline plane, the direction of the electric field is not normal to that of the spontaneous polarization directed in the C-crystal axis direction. Therefore, the electric field has a component directed to a −C-crystal axis direction, and an inverted-polarization kernel is formed by the component. The polarization of the inverted-polarization kernel is directed in the −C-crystal axis direction which is opposite to the direction of the spontaneous polarization.

Thereafter, when the thermal processing of the ferroelectric substrate and the proton exchange regions are continued, the inverted-polarization kernel is growing so that the proton exchange regions and the ferroelectric substrate positioned under the proton exchange regions are changed to a plurality of inverted-polarization regions arranged at the regular intervals. Inverted polarization of the inverted-polarization regions is directed in the –C-crystal axis direction opposite to the C-crystal axis direction.

In this case, because the normal line of the surface of the ferroelectric substrate is inclined from the C-crystal axis, the diffusion speed of the Li⁺ and H⁺ ions in a depth direction of the proton exchange layers is enhanced as compared with that in the ±C-crystal axis directions. Therefore, the inverted-polarization layers are formed at a high depth.

Thereafter, the optical waveguide crossing alternate rows of the inverted-polarization layers and the ferroelectric substrate positioned between the inverted-polarization layers is formed. A refractive index of the optical waveguide is higher than the ferroelectric substrate so that coherent light transmitting through the optical waveguide is confined.

Accordingly, when the coherent light consisting of fundamental waves transmits through the optical waveguide, the fundamental waves can be converted into the second harmonic waves at a high conversion efficiency because the inverted-polarization layers are formed at a high depth.

The second object is achieved by the provision of a shorter wavelength coherent light generating apparatus, comprising:

a semiconductor laser for radiating coherent light consisting of fundamental waves; and an optical wavelength converting device for converting the fundamental waves radiated from the semiconductor laser into second harmonic waves of which a wavelength is half of that of the fundamental waves, comprising a ferroelectric substrate having an upper surface of which a normal line is inclined to a C-crystal axis toward an X-Y crystalline plane defined as (001) crystalline plane in Miller indices, spontaneous polarization of the ferroelectric substrate being directed toward a +C-crystal axis direction of the C-crystal axis.

a plurality of inverted-polarization layers arranged at regular intervals in an upper surface region of the ferroelectric substrate, polarization of the inverted-polarization layers being directed toward a –C-crystal axis direction of the C-crystal axis, and the inverted-polarization layers being formed by exchanging positive ions included in the ferroelectric substrate for H⁺ ions, and an optical waveguide crossing alternate rows of the inverted-polarization layers and the ferroelectric substrate positioned between the inverted-polarization layers, a refractive index of the optical waveguide being higher than that of the ferroelectric substrate to confine the fundamental waves radiated from the semiconductor laser, and the fundamental waves being converted into second harmonic waves in the alternate rows of the optical waveguide.

In the above configuration, coherent light polarized in a transverse electric mode (TE mode) is radiated from the semiconductor laser to an incident end facet of the optical waveguide. In this case, because a normal line of the ferroelectric substrate is inclined to a C-crystal axis toward an X-Y crystalline plane, the coherent light polarized in the TE mode can couple to the optical waveguide at high coupling efficiency. Thereafter, fundamental waves of the coherent light are converted into second harmonic waves, and the second harmonic waves are output from an output end facet of the optical waveguide.

Accordingly, the shorter wavelength coherent light generating apparatus can be manufactured without utilizing any polarizer. Therefore, the configuration of the apparatus can be simplified, and the apparatus can be manufactured in a small size.

BRIEF DESCRIPTION OF THE DRAWINGS

The objects, features and advantages of the present invention will be apparent from the following description taken in conjunction with the accompanying drawings, in which:

FIGS. 1A to 1E are cross sectional views of a LiTaO₃ substrate showing a conventional manufacturing method of a conventional optical wavelength converting device in which inverted-polarization layers and non-inverted polarization layers are periodically arranged in an upper side of LiTaO₃ substrate;

FIGS. 1F to 1H are diagonal views of the LiTaO₃ substrate showing the conventional manufacturing method;

FIG. 2 is a cross sectional view of the LiTaO₃ substrate showing a forming mechanism of an inverted-polarization layer;

FIG. 3(a) is a constitutional view of the LiTaO₃ substrate schematically showing a conventional shorter wavelength coherent light generating apparatus;

FIG. 3(b) shows a distribution and a direction of electric field according to a TE mode and another distribution and another direction of electric field according to a TM mode;

FIG. 4 is a cross sectional view showing inverted-polarization layers connected to each other according to the conventional manufacturing method shown in FIGS. 1A to 1H;

FIG. 7A is an enlarged diagonal view of a proton exchange layer shown in FIG. 6D, showing the formation of an inverted polarization kernel in a first sample;

FIG. 7B is an enlarged diagonal view of a proton exchange layer shown in FIG. 6D, showing the formation of an inverted polarization kernel in a second sample;

FIGS. 10A, 10B are cross sectional views of inverted-polarization layers, showing the inverted-polarization layers periodicaiiy formed in FIG. 10A, and showing the inverted-polarization layers connected each other in FIG. 10B;

FIGS. 11A and 11B are diagonal views of the LiTaO₃ substrate with the inverted-polarization layers shown in FIG. 5, showing the manufacturing method of an optical waveguide shown in FIG. 5;

FIGS. 16A, 16B are cross sectional views of a $LiTaO_3$ substrate shown in FIG. 14, showing a manufacturing method of inverted-polarization layers;

FIG. 17 is an enlarged diagonal view of a proton exchange layer shown in FIG. 16A, schematically showing internal electric field induced by a proton exchange processing to form an inverted polarization kernel;

FIG. 20 schematically shows an extending direction $D_E$ of an inverted-polarization layer according to a modification of the second embodiment;

FIG. 21A shows a distribution and a direction of electric field induced by coherent light radiated from a semiconductor laser according to a TE mode;

FIG. 21B shows a distribution and a direction of electric field induced by coherent light coupled to an optical waveguide according to a TE mode;

FIG. 22 is a constitutional view of a shorter wavelength coherent light generating apparatus according to a third embodiment;

DETAIL DESCRIPTION OF THE PREFERRED EMBODIMENTS

Preferred embodiments of a manufacturing method of an optical wavelength converting device and the optical wavelength converting device according to the present invention are initially described with reference to drawings.

(First Embodiment)

Figure 5:
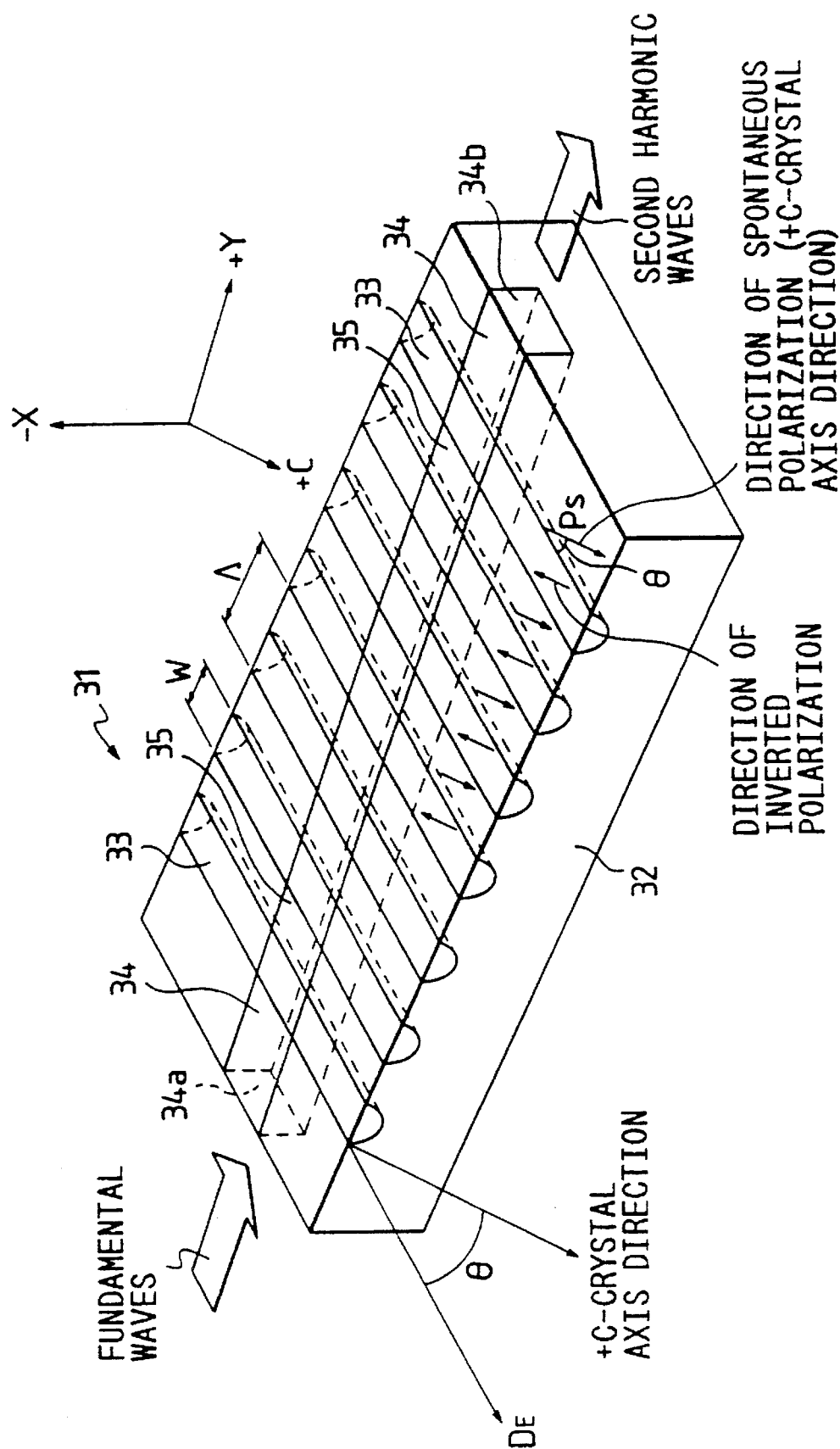
FIG. 5 is a constitutional diagonal view of an optical wavelength converting device according to a first embodiment of the present invention.

FIG. 5 is a constitutional diagonal view of an optical wavelength converting device according to a first embodiment of the present invention.

As shown in FIG. 5, an optical wavelength converting device 31 comprises a $LiTaO_3$ substrate 32 having a –X lattice plane on its upper surface, a plurality of inverted-polarization layers 33 periodically arranged in an upper surface region of the $LiTaO_3$ substrate 32 at regular intervals Λ (1≦Λ≦20 μm), and an optical waveguide 34 arranged on a central upper surface region of the $LiTsO_3$ substrate 32 to cross alternate rows of the inverted-polarization layers 33 and non-inverted polarization layers 35.

The $LiTaO_3$ substrate 32 is formed by cutting out $LiTaO_3$ crystal along a particular plane perpendicular to the X-crystal axis defined as a crystal orientation [100], and the upper surface of the $LiTaO_3$ substrate 32 is directed toward a –X-crystal axis direction. Therefore, the –X lattice plane is defined as $(\bar{1}00)$ crystalline plane in Miller indices. Also, the spontaneous polarization Ps of the $LiTaO_3$ substrate 31 is directed in a +C-crystal axis direction.

An extending direction $D_E$ of each inverted-polarization layer 33 is inclined at an angle of θ degrees (6≦θ174 degrees or –174≦θ≦–6 degrees) to the +C-crystal axis direction toward a –Y-crystal axis direction. The negative inclination θ (–174≦θ≦6 degrees) denotes the extending direction $D_E$ inclined toward a +Y-crystal axis direction. A width W of each inverted-polarization layer 33 is W=Λ/2. Also, the inverted polarization of the inverted-polarization layers 33 is directed in a −C-crystal axis direction opposite to the direction off the spontaneous polarization Ps.

The optical waveguide 34 extends in parallel to the Y-crystal axis, and a refractive index of the optical waveguide 34 is higher than the LiTaO$_3$ substrate 32 to confine coherent light. Because the optical waveguide 34 is formed by exchanging Li$^+$ ions of the LiTaO$_3$ substrate 32 and the inverted-polarization layers 33 for H$^+$ ions, the refractive index of the optical waveguide 34 in the ±C-crystal axis directions becomes larger than that of the optical waveguide 34 in other directions. Therefore, amplification directions of electric field induced by the coherent light transmitting through the optical waveguide 34 are required to be directed in parallel to the C-crystal axis. To obtain the amplification directions directed in parallel to the C-crystal axis, the coherent light is required to transmit in a direction perpendicular to the C-crystal axis. Therefore, the optical waveguide 34 extends in parallel to the Y-crystal axis which is perpendicular to the C-crystal axis.

In the above configuration, coherent light consisting of fundamental waves is radiated to an incident end facet 34a of the optical waveguide 34, and the coherent light transmits through alternate rows consisting of the inverted-polarization layers 33 and the non-inverted polarization layers 35. In detail, the fundamental waves are converted into second harmonic waves, of which a wavelength $\lambda_n$ is half of a wavelength $\lambda_f$ of the fundamental waves, in the inverted-polarization layer 33. The phase of the second harmonic waves converted is inverted while transmitting through the inverted-polarization layer 33. Thereafter, the second harmonic waves transmit through the non-inverted polarization layer 35. In this case, because the polarization direction of the non-inverted polarization layer 35 is opposite to that of the inverted-polarization layer 33, the second harmonic waves transmitting through the non-inverted polarization layer 35 are amplified. In other words, mismatching between a propagation constant of the fundamental waves and another propagation constant of the second harmonic waves is compensated by a periodical structure of the alternate rows. As a result, the fundamental waves are converted into the second harmonic waves, and the second harmonic waves converted are amplified. Thereafter, the second harmonic waves amplified are radiated from an output end facet 34b of the optical waveguide 34.

Next, a manufacturing method of the inverted-polarization layers 33 is described.

Figure 6A:
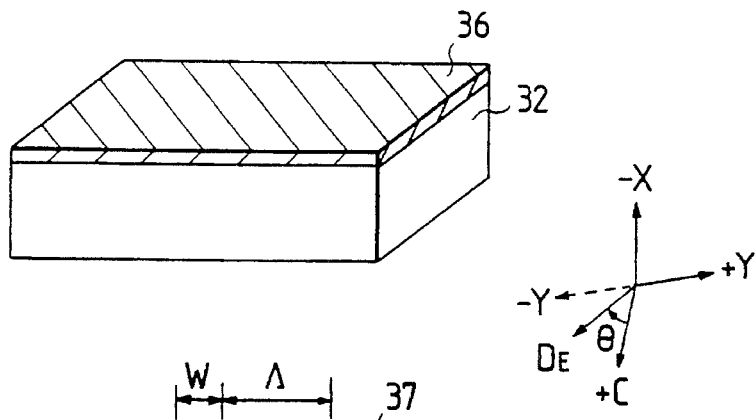
FIG. 6A to 6E are diagonal views of the LiTaO₃ substrate shown in FIG. 5, showing a manufacturing method of inverted-polarization layers periodically arranged.
Figure 6B:
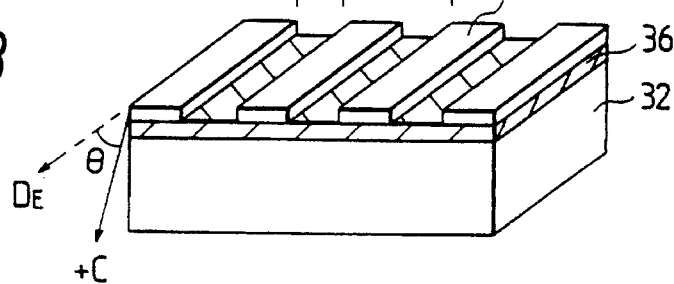
Figure 6C:
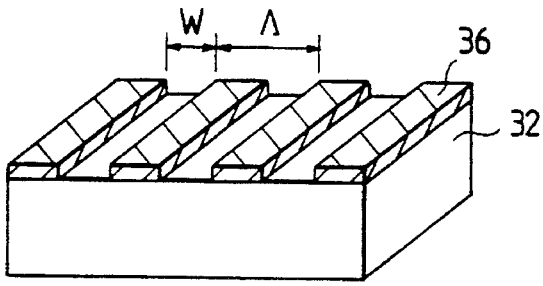

FIGS. 6A to 6E are diagonal views of the LiTaO$_3$ substrate 32, showing a manufacturing method of the inverted-polarization layers 33.

as shown in FIG. 6A, a Ta film 36 is deposited on the LiTaO$_3$ substrate 32 at a thickness of 30 nm according to a sputtering method. Thereafter, as shown in FIG. 6B, a photoresist is coated on the Ta film 36 and is patterned to form a plurality of photoresist stripes 37 periodically arranged at the regular intervals Λ according to a photolithography method. A distance between the stripes 37 is substantially equivalent to the width W of the inverted-polarization layer 33, and the photoresist stripes 37 are arranged in series in a direction inclined at an angle of θ degrees to the +C-crystal axis direction toward the −Y-crystal axis direction. In the first embodiment, three types of samples are prepared. A first inclined angle $\theta_1$ of a first sample is set to $\theta_1$=−22 degrees, and a second inclined angle $\theta_2$ of a second sample is set to $\theta_2$=22 degrees. Also, a third angle $\theta_3$ of a third sample is set to $\theta_3$=0 degree. Thereafter, as shown in FIG. 6C, the pattern of the photoresist stripes 37 is transferred to the Ta film 36 in a CF$_4$ atmosphere according to a dry etching, and the photoresist stripes 37 are taken off.

Figure 6D:
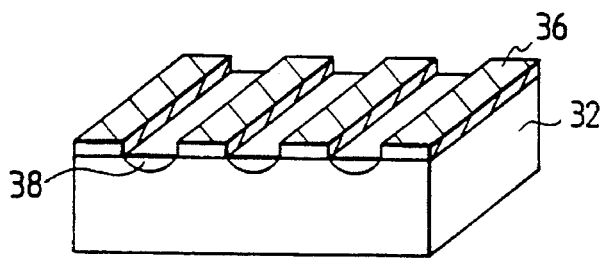

Thereafter, as shown in FIG. 6D, the LiTaO$_3$ substrate 32 is immersed in a dilute pyrophosphoric acid solution at a temperature off 260° C. for forty minutes to periodically form a plurality of proton exchange layers 38 in the LiTaO$_3$ substrate 32 not covered with the patterned Ta film 36. The dilute pyrophosphoric acid solution is obtained by mixing pyrophosphoric acid (H$_4$P$_2$O$_7$) with lithium phosphate (Li$_3$PO$_4$) at a weight ratio of 20/80 of Li$_3$PO$_4$/H$_4$P$_2$O$_7$. In the conventional manufacturing method, the LiTaO$_3$ substrate 11 is immersed in the pure pyrophosphoric acid solution to uniformly form the proton exchange layers 13. Also, the Li$^+$ ions of the LiTaO$_3$ substrate 11 can be efficiently exchanged for the H$^+$ ions of the pure pyrophosphoric acid solution. However, the upper surface of the LiTaO$_3$ substrate 32 defined as the −X lattice plane becomes rough because of the erosion of the LiTaO$_3$ substrate 32 when the LiTaO$_3$ substrate 32 is immersed in the pure pyrophosphoric acid solution at a temperature of 260° C. for over twenty minutes. Therefore, the dilute pyrophosphoric acid solution is utilized in the present invention to protect the LiTaO$_3$ substrate 32 from being eroded. Also, the Li$^+$ ions of the LiTaO$_3$ substrate 32 is efficiently exchanged for the H$^+$ ions of the diluted pyrophosphoric acid solution in the same manner as in the conventional manufacturing method. In addition, Ta material has superior characteristics in which the upper surface of the LiTaO$_3$ substrate 32 covered with the patterned Ta film 36 is completely protected from being exchanged for the H$^+$ ions. Therefore, the proton exchange layers 38 are patterned with high accuracy according to the pattern transferred to the Ta film 36.

Thereafter, the LiTaO$_3$ substrate 32 with the proton exchange layers 38 is heated up at a rising rate of over 10° C./second by radiating infrared rays to the LiTaO$_3$ substrate 32 with an infrared radiation heating apparatus according to a rapid thermal annealing method. Because the rapid thermal annealing method is utilized, the rising rate can be controlled in a range from a very low degree to a high degree. Therefore, the rising rate can be increased to over 50° C./second. Thereafter, the proton exchange layers 38 are thermally processed at a temperature ranging from 500° C. to 600° C. for ten seconds to diffuse the H$^+$ ions densely included in the proton exchange layers 38 into the LiTaO$_3$ substrate 32. Therefore, as shown in FIGS. 7A, 7B, an inverted-polarization kernel 39 is reliably formed in the upper surface region of the LiTaO$_3$ substrate 32 in the first and second samples ($\theta_1$=−22°, $\theta_2$=22°) when the proton exchange layers 38 are thermally processed at a temperature of 530° C.

FIG. 7A is an enlarged diagonal view of the proton exchange layer 38, showing the formation of an inverted polarization kernel in the first sample. FIG. 7B is an enlarged diagonal view of the proton exchange layer 38, showing the formation of an inverted polarization kernel in the second sample:

As shown in FIG. 7A, in cases where the extending direction D$_E$ of the proton exchange layer 38 is inclined at an angle of $\theta_1$=−22 degrees to the +C-crystal axis direction toward the +Y-crystal axis direction, the inverted-polarization kernel 39 is formed at the left side of the proton exchange layer 38.

Also, as shown in FIG. 7B, in cases where the extending direction D$_E$ of the proton exchange layer 38 is inclined at an angle of $\theta_1$=+22 degrees to the +C-crystal axis direction toward the −Y-crystal axis direction, the inverted-polarization kernel 39 is formed at the right side of the proton exchange layer 38.

The reason that the inverted polarization kernel 39 is formed in the first and second samples is described with reference to FIG. 8.

Figure 8:
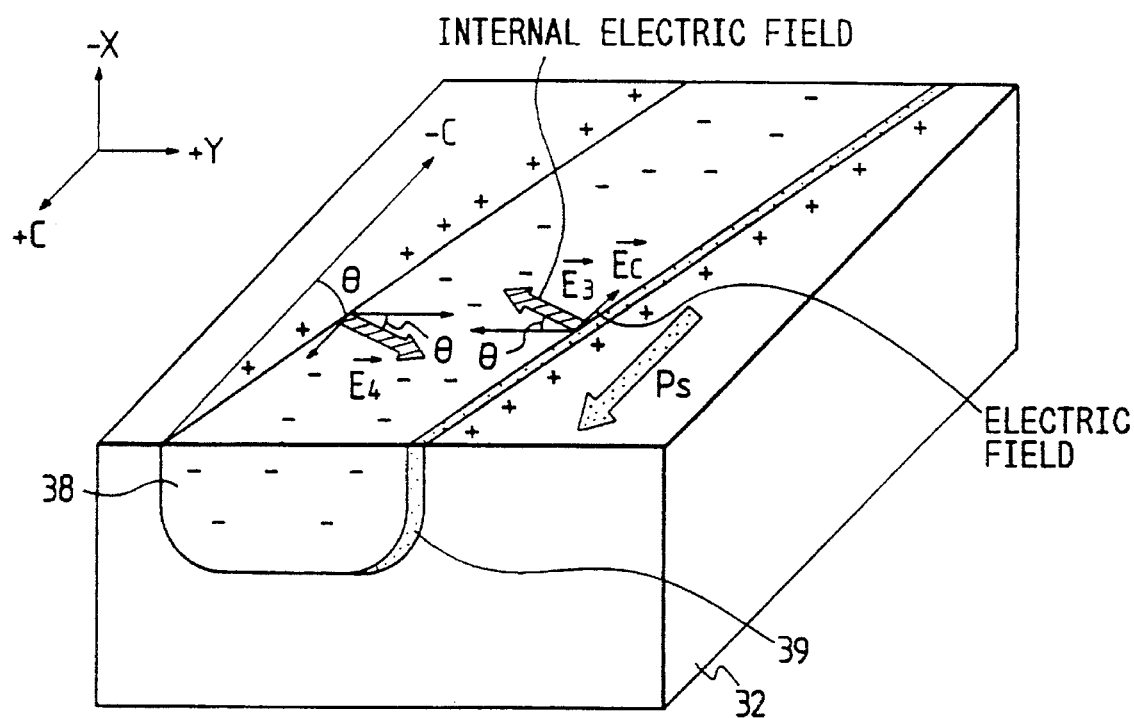
FIG. 8 is an enlarged diagonal view of a proton exchange layer shown in FIG. 6D, schematically showing internal electric field induced by a proton exchange processing to form an inverted polarization kernel.

As shown in FIG. 8, when the LiTaO$_3$ substrate 32 is thermally heated, Li$^+$ ions of the LiTaO$_3$ substrate 32 are diffused into a proton exchange layer 38, and H$^+$ ions of the proton exchange layer 38 are diffused into the LiTaO$_3$ substrate 32. At this time, internal electric fields E$_3$, E$_4$ are induced in boundary regions between the LiTaO$_3$ substrate 32 and the proton exchange layer 38 because the diffusion speed of the H$^+$ ions is faster than that of Li$^+$ ions. The internal electric fields E$_3$, E$_4$ are directed from the LiTaO$_3$ substrate 32 to the proton exchange layer 38 at right angles. In this case, because the extending direction D$_E$ of the proton exchange layer 38 is inclined at an angle of θ degrees to the +C-crystal axis direction, directions of the internal electric fields E$_3$, E$_4$ are inclined at an angle of θ degrees to the +Y-crystal axis or −Y-crystal axis direction. Therefore, an intensity of an electric field component of the internal electric field E$_3$ directed in the −C-crystal axis direction is designated by E*sinθ. Where the symbol E denotes an intensity of the internal electric field E$_3$. Also, the spontaneous polarization Ps of the LiTaO$_3$ substrate 32 is directed in the +C-crystal axis direction. As a result, an electric field E$_c$ directed in a direction opposite to the direction of the spontaneous polarization Ps is substantially induced, and the intensity of the electric field E$_c$ is E,sinθ. Therefore, an inverted-polarization kernel 39 is formed in a side surface region of the proton exchange layer 38. Accordingly, the inverse-polarization kernel 39 can be reliably formed in the first and second samples.

In contrast, no inverted-polarization kernel is formed in the third sample (θ$_3$=0). The reason that no inverted-polarization kernel is formed in the third sample is described with reference to FIG. 9.

Figure 9:
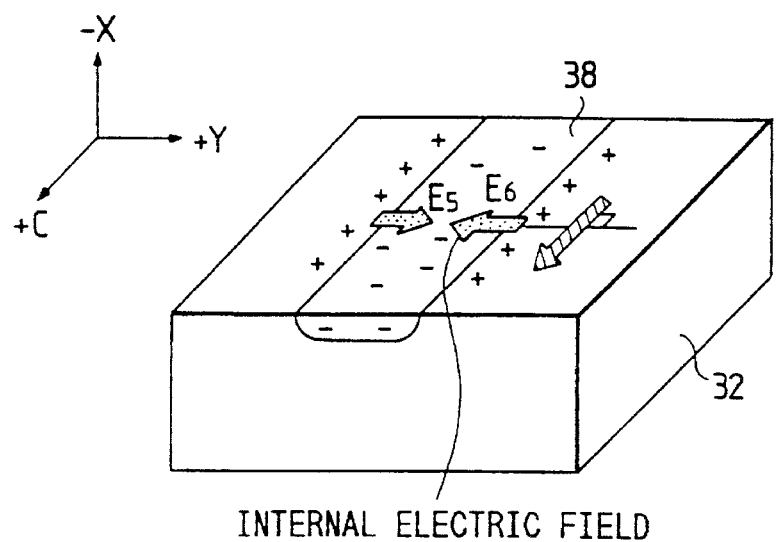
FIG. 9 is an enlarged diagonal view of a proton exchange layer formed in a third sample, schematically showing a phenomenon in which no inverted polarization kernel internal is formed even though internal electric field is induced by a proton exchange processing.

As shown in FIG. 9, when the LiTaO$_3$ substrate 32 is thermally heated, internal electric fields E$_5$, E$_6$ are induced in boundary regions between the LiTaO$_3$ substrate 32 and a proton exchange layer 38 because the diffusion speed of the H$^+$ ions is faster than that of Li$^+$ ions. The internal electric fields E$_5$, E$_6$ are directed from the LiTaO$_3$ substrate 32 to the the proton exchange layer 38 at right angles. Therefore, in cases where the extending direction D$_E$ of the proton exchange layer 38 is just directed in the C-crystal axis, the internal electric fields E$_5$, E$_6$ are directed in the +Y-crystal axis direction or −Y-crystal axis direction which is perpendicular to the direction of the spontaneous polarization Ps of the LiTaO$_3$ substrate 32. In this case, because intensity of electric field components of the internal electric fields E$_1$, E$_2$ directed in the −C-crystal axis direction is zero, no electric field directed in a direction opposite to the direction of the spontaneous polarization Ps is induced. Therefore, no inverted-polarization kernel is formed in the boundary regions in the third sample.

In practice, the inclination angle θ equal to or more than 6 degrees and the inclination angle θ equal to or less than −6 degrees are available. Also, because the extending direction D$_E$ of the inverted-polarization layer 33 is required to be inclined to the −C-crystal axis direction in the same manner to form the inverted-polarization kernel 39, the range required of the inclination angle θ is 6≦θ—174 degrees or −174≦θ≦−6 degrees. Here the minus value of θ denotes that the extending direction D$_E$ is inclined toward the +Y-crystal axis direction.

Thereafter, the thermal processing of the proton exchange layer 38 is continued at a temperature ranging from 500° C. to 600° C. to form the inverted-polarization layers 33 in the upper surface region of the the LiTaO$_3$ substrate 32. Thereafter, the LiTaO$_3$ substrate 32 is immersed in a mixed solution of HF and HNF$_3$ (HF: HNF$_3$=1:1) to take off the patterned Ta film 36.

FIGS. 10A, 10B are cross sectional views of the inverted-polarization layers 33, showing the inverted-polarization layers 33 periodically formed in FIG. 10A, and showing the inverted-polarization layers 33 connected each other in FIG. 10B.

The formation of the inverted-polarization layers 33 is performed by continuing the thermal processing on condition that the inclination angle is θ=+22 degrees and the regular intervals of the patterned Ta films 36 are Λ=10 μm. As shown in FIG. 10A, in cases where the thermal processing of the proton exchange layer 38 is continued at a temperature of 580° C. for ten seconds, the inverted-polarization layers 33 periodically arranged are formed. However, in cases where the thermal processing of the proton exchange layer 38 is continued at a temperature of 580° C. for sixty seconds, as shown in FIG. 10B, the inverted-polarization layers 33 formed are connected to each other because the inverted-polarization layers 33 extend in a horizontal direction as the thermal processing is continued.

Also, in cases where the LiTaO$_3$ substrate 32 with the proton exchange layer 38 is heated up at a rising rate of about 1° C./second in a furnace in the same manner as in the conventional manufacturing method, the inverted-polarization layers 33 formed are connected to each other because it takes a long time to heat up the proton exchange layer 38.

Figure 6E:
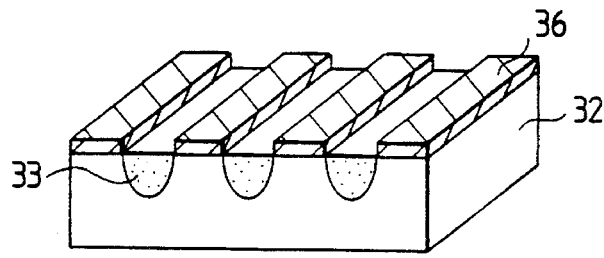

As a result, as shown in FIG. 6E, the inverted-polarization layers 33 periodically arranged is formed on condition that the rising rate of the LiTaO$_3$ substrate 32 with the proton exchange layer 38 is equal to or more than 10° C./second and the thermal processing of the proton exchange layer 38 is finished within sixty seconds.

In addition, the proton exchange layer 38 is changed to the inverted-polarization layer 33 while the inverted-polarization kernel 39 grows. However, the inverted-polarization kernel 39 cannot grow in cases where the width W of the proton exchange layer 38 is over 10 μm. Therefore, the width W of the proton exchange layer 38 is limited to 10 μm or less to uniformly form the inverted-polarization layers 33. In other words, a distance between the Ta films 36 is limited to 10 μm or less.

For example, in cases where the regular intervals of the inverted-polarization layers 33 are Λ=4 μm, the depth of the inverted-polarization layers 33 reaches 3 μm. Because the depth of the inverted-polarization layers 14 formed according to the conventional manufacturing method is no more than 2 μm when the regular intervals of the inverted-polarization layers 14 are 4 μm, the depth of the inverted-polarization layers 33 periodically arranged is 1.5 times that in the conventional manufacturing method.

Accordingly, because a depth direction of the inverted-polarization layers 33 agrees with the +X-crystal axis direction defined as the crystal orientation [100], the growth of the inverted-polarization layers 33 in the depth direction can be enhanced. Therefore, even though the regular intervals Λ of the inverted-polarization layers 33 are shortened to obtain blue light, the inverted-polarization layers 33 can be deepened without connecting the inverted-polarization layers 33 to each other. As a result, the coherent light consisting of fundamental waves can be efficiently converted into second harmonic waves because a ratio of the fundamental waves not transmitting through the inverted-polarization layers 33 is decreased.

Also, because the proton exchange layers 38 are rapidly heated up and are thermally processed according to the infrared heating, the inverted-polarization layers 33 periodically arranged can be formed at high speed without connecting the inverted-polarization layers 33 to each other.

Next, a manufacturing method of the optical waveguide 34 performed after the inverted-polarization layers 33 are formed is described.

To efficiently convert the fundamental waves into the second harmonic waves, a transmission loss caused by periodic changes of a refractive index of the optical waveguide 34 is required to be reduced. Therefore, it is required that a refractive index of the inverted-polarization layers 33 in the optical waveguide 34 is substantially the same as that of the non-inverted polarization layers 35 in the optical waveguide 34.

Because the proton exchange layer 38 are formed by exchanging the $Li^+$ ions for the $H^+$ ions, a refractive index of the proton exchange layer 38 undesirably differs from that of the $LiTaO_3$ substrate 32. Therefore, the refractive index of the inverted-polarization layers 33 formed by thermally processing the proton exchange layer 38 necessarily differs from that of the $LiTaO_3$ substrate 32. For example, when the refractive indices of the inverted-polarization layers 33 and the $LiTaO_3$ substrate 32 are measured according to a prism coupler method, a refractive index difference between the inverted-polarization layers 33 and the $LiTaO_3$ substrate 32 is about 0.02. Therefore, in cases where the inverted-polarization layers 33 and the $LiTaO_3$ substrate 32 positioned between the inverted-polarization layers 33 are changed to the optical waveguide 34 according to the conventional manufacturing method, the refractive index of the inverted-polarization layers 33 necessarily differs from that of the non-inverted polarization layers 35 obtained by changing the $LiTaO_3$ substrate 32. As a result, periodic changes of a refractive index are formed in the optical waveguide 34, so that the transmission loss in the optical waveguide 34 considerably becomes large.

In the present invention, a refractive index difference between the inverted-polarization layers 33 and the non-inverted polarization layers 35 is reduced.

FIGS. 11A and 11B are diagonal views of the $LiTaO_3$ substrate 32 with the inverted-polarization layers 33, showing the manufacturing method of the optical waveguide 34.

The $LiTaO_3$ substrate 32 with the inverted-polarization layers 33 is initially annealed at an annealing temperature of 450° C. for four hours according to an annealing processing to diffuse exchanged ions such as $H^+$ ions and $Li^+$ ions existing in the $LiTaO_3$ substrate 32. Therefore, the refractive index difference between the inverted-polarization layers 33 and the $LiTaO_3$ substrate 32 is reduced to 0.005 or less. The annealing temperature in the annealing processing is limited to less than 550° C., and the annealing time is required to be for one hour or more. In cases where the inverted-polarization layers 33 is annealed at an annealing temperature of 550° C. or more, a polarization direction of the inverted-polarization layers 33 is again inverted so that the inverted-polarization layers 33 disappear.

Thereafter, as shown in FIG. 11A, Ta material is deposited on the $LiTaO_3$ substrate 32 with the inverted-polarization layers 33 according to a sputtering method and is patterned according to a photolithography method and a dry etching method to form a Ta mask 40 having a slit 40A. The slit 40A extends in parallel to the Y-crystal axis, and a width of the slit 40A is 4 μm. Thereafter, the $LiTaO_3$ substrate 32 with the inverted-polarization layers 33 is immersed in the pyrophosphoric acid solution for twenty minutes to thermally process at a temperature of 230° C. Therefore, as shown in FIG. 11B, a part of $Li^+$ ions of the $LiTaO_3$ substrate 32 not covered with the Ta mask 40 are exchanged for $H^+$ ions, and the $LiTaO_3$ substrate 32 and the inverted-polarization layers 33 not covered with the Ta mask 40 are changed to the optical waveguide layer 34 having a peculiar high refractive index. Thereafter, the Ta mask 40 is taken off, and the end facets 34a, 34b of the optical waveguide 34 are optically polished. As a result, as shown in FIG. 5, the optical wavelength converting device 31 is manufactured.

Next, the influence of the annealing temperature in the annealing processing on optical characteristics of the optical wavelength converting device 31 is described.

The optical wavelength converting device 31 manufactured by annealing at the annealing temperature of 450° C. for one hour according to the annealing processing is prepared as a sample A. The optical wavelength converting device 31 manufactured without performing the annealing processing is prepared as a sample B. The optical wavelength converting device 31 manufactured by annealing at the annealing temperature of 550° C. for one hour according to the annealing processing is prepared as a sample C. Thereafter, coherent light of 800 μm wavelength radiated from a semiconductor laser is focused on the incident end facet 34a of the optical waveguide 34 at an output power of 40 mW. Thereafter, fundamental waves and second fundamental waves outgoing from the output end facet 34a of the optical waveguide 34 are collimated, and an outgoing power of the fundamental waves and another outgoing power of the second harmonic waves collimated are measured with a power meter.

Figures 12, 13:
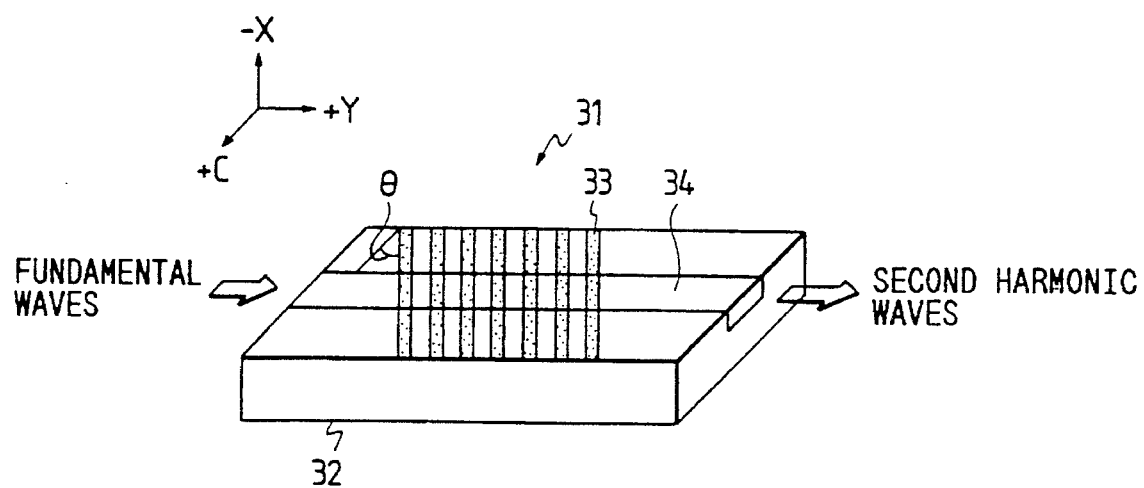
FIG. 12 shows measurement results of an outgoing power to indicate the influence of an annealing processing and an annealing temperature on optical characteristics of the optical wavelength converting device shown in FIG. 5.
FIG. 13 is a diagonal view of the optical wavelength converting device having a particular size to estimate optical characteristics.

FIG. 12 shows measurement results of the outgoing powers to indicate the influence of the annealing processing and the annealing temperature on optical characteristics of the optical wavelength converting device 31.

By comparison of the samples A and B, it is realized that the refractive index difference between the inverted-polarization layers 33 and the $LiTaO_3$ substrate 32 is reduced by performing the annealing processing. Therefore, the transmission loss of the waves in the optical waveguide 34 is lowered from 2 dB/cm (sample B) to 0.4 dB/cm (sample A). Specifically, the outgoing power of the fundamental waves is increased from 10 mW (sample B) to 20mW (sample A), and the outgoing power of the second harmonic waves is increased from 0.5 mW (sample B) to 1.0 mW (sample A). Accordingly, conversion efficiency of the fundamental waves to the second harmonic waves can be greatly improved by performing the annealing processing.

By comparison of the samples A and C, it is realized that the inverted-polarization layers 33 disappear in the sample C because the annealing temperature is too high. Specifically, though the outgoing power of the fundamental waves in the sample C is the same that in the sample A, the fundamental waves are not converted into the second harmonic waves in the sample C. Accordingly, the conversion efficiency can be greatly improved by performing the annealing processing in the range from 450° C. to 550° C.

Next, evaluation results of the optical characteristics of the optical wavelength converting device 31 are described.

To evaluate the optical characteristics of the device 31 as shown in FIG. 13, the device 31 having the inverted-polarization layers 33 of which the extending direction $D_E$ is rotated at an inclination angle of 20 degrees to the +C-crystal axis direction toward the +Y-crystal axis direction, the regular period is $\Lambda=4$ µm, the width is W=2 µm, and the depth is 2 µm, and the optical waveguide 34 of which the width is 4 µm, the depth is 1.9 µm, and the length is 10 mm. In this case, fundamental waves of the wavelength $\lambda_f=860$ nm satisfy the quasi-phase-matching condition $\Lambda=m*\lambda_f/\{2*(N2\omega-N\omega)\}$ (m is an integer) on condition of m=1. Here the integer m denotes order of the quasi-phase-matching.

When coherent light of the wavelength $\lambda_f=860$ nm is radiated to the incident end facet 34a of the optical waveguide 34 at an output power of 115 mW, second harmonic waves of the wavelength $\lambda_n=430$ nm are output from the output end facet 34b of the optical waveguide 34. An outgoing power of the second harmonic waves is 23 mW, so that the conversion efficiency is 1.5 times higher than that in the conventional optical wavelength converting device.

In the first embodiment, the upper surface of the LiTaO$_3$ substrate 32 is defined as a –X lattice plane in Miller indices. However, because the growth of the inverted-polarization layers 33 in the depth direction is enhanced in cases where the depth direction is perpendicular to the C-crystal axis, the LiTaO$_3$ substrate having an upper surface defined as an +X lattice plane, a –Y lattice plane, or a +Y lattice plane is available in the first embodiment. In other words, in cases where LiTaO$_3$ crystal is cut out in parallel to the C-crystal axis to form a LiTaO$_3$ substrate having a surface plane parallel to the C-crystal axis, the LiTaO$_3$ substrate having a surface plane parallel to the C-crystal axis is applicable in the first embodiment.

Also, the regular intervals $\Lambda$ of the inverted-polarization layers 33 are determined in dependence on the wavelength of the fundamental waves $\lambda_f$ to satisfy the quasi-phase-matching condition $\Lambda=m*\lambda_f/\{2*(N2\omega-N\omega)\}$. Because the conversion efficiency of the fundamental waves to the second harmonic waves is maximized when m=1 is satisfied, it is preferred that the regular intervals $\Lambda$ range from 3 µm to 5 µm to obtain blue light having a wavelength ranging almost from 400 to 500 nm as the second harmonic waves.

Also, pure LiTaO$_3$ crystal is utilized as one of the V ferroelectric substance in the first embodiment. However, LiTaO$_3$ crystal doped by MgO, Nb, or Nd is also applicable. In addition, pure LiNbO$_3$ crystal or LiNbO$_3$ crystal doped by MgO, Ta, or Nd is applicable. For example, LiTaO$_3$ crystal doped by Nb has a high non-linear optical constant and superior photo-damage resisting properties. Also, LiTaO$_3$ crystal doped by MgO and LiNbO$_3$ crystal doped by MgO respectively have superior photo-damage resisting properties.

Also, the infrared radiation heating apparatus is utilized to thermally process the proton exchange layer 38. However, a heating apparatus for rapidly heating the proton exchange layer 38 according to the rapid thermal annealing method is not limited to the infrared radiation heating apparatus. For example, a flash lamp heating apparatus or a CO$_2$ laser heating apparatus is applicable to rapidly heat the proton exchange layer 38.

Also, the dilute pyrophosphoric acid solution is utilized to form the proton exchange layers 38 in the first embodiment. However, a dilute phosphoric acid solution obtained by mixing phosphoric acid such as orthophosphoric acid (H$_2$PO$_4$) with the lithium phosphate is applicable in place of the dilute pyrophosphoric acid solution.

Also, the pyrophosphoric acid solution is diluted by lithium phosphate to form the dilute pyrophosphoric acid solution in the first embodiment. However, diluent is not Limited to the lithium phosphate. That is, any base including lithium such as benzoic lithium (LiCH$_3$COOH) is applicable as the diluent.

Also, the Ta film 36 is utilized to protect Li$^+$ ions of the LiTaO$_3$ substrate 32 from being exchanged for H$^+$ ions in the first embodiment. However, a film having acid resisting properties such as a Ta$_2$O$_5$ film, a Pt film, a Au film a W film, a Ti film, or a Ag film is applicable in place of the Ta film 36.

Also, the proton exchange optical waveguide 34 is formed by exchanging Li$^+$ ions of the inverted-polarization and non-inverted polarization layers 33, 35 for H$^+$ ions. However, Ti diffusing optical waveguide, Nb diffusing optical waveguide, or ion injecting optical waveguide is applicable in place of the optical waveguide 34.

Also, the Ta mask 40 is utilized to protect Li$^+$ ions of the LiTaO$_3$ substrate 32 from being exchanged for H$^+$ ions in the first embodiment. However, a film having acid resisting properties such as a Ta$_2$O$_5$ film, a Pt film, a Au film, or a W film is applicable in place of the Ta mask 40.

Also, the pyrophosphoric acid solution is utilized to form the optical waveguide 34 in the first embodiment. However, the acid solution is not limited to the pyrophosphoric acid solution. That is, orthophosphoric acid (H$_2$PO$_4$) is applicable in place of the pyrophosphoric acid solution.

Also, the manufacturing method of the inverted-polarization layers 33 is applied to the manufacturing method of the optical wavelength converting device 31. However, the manufacturing method of the inverted-polarization layers 33 can be also applied to that of a light switch or a grating in which an electro-optics effect is utilized. Also, the manufacturing method of the inverted-polarization layers 33 can be also applied to that of a surface acoustic wave device in which a piezo electric effect is utilized.

(Second Embodiment)

Next, an optical wavelength converting device of which an upper surface plane is not parallel to the –C-crystal axis direction is described.

Figure 14:
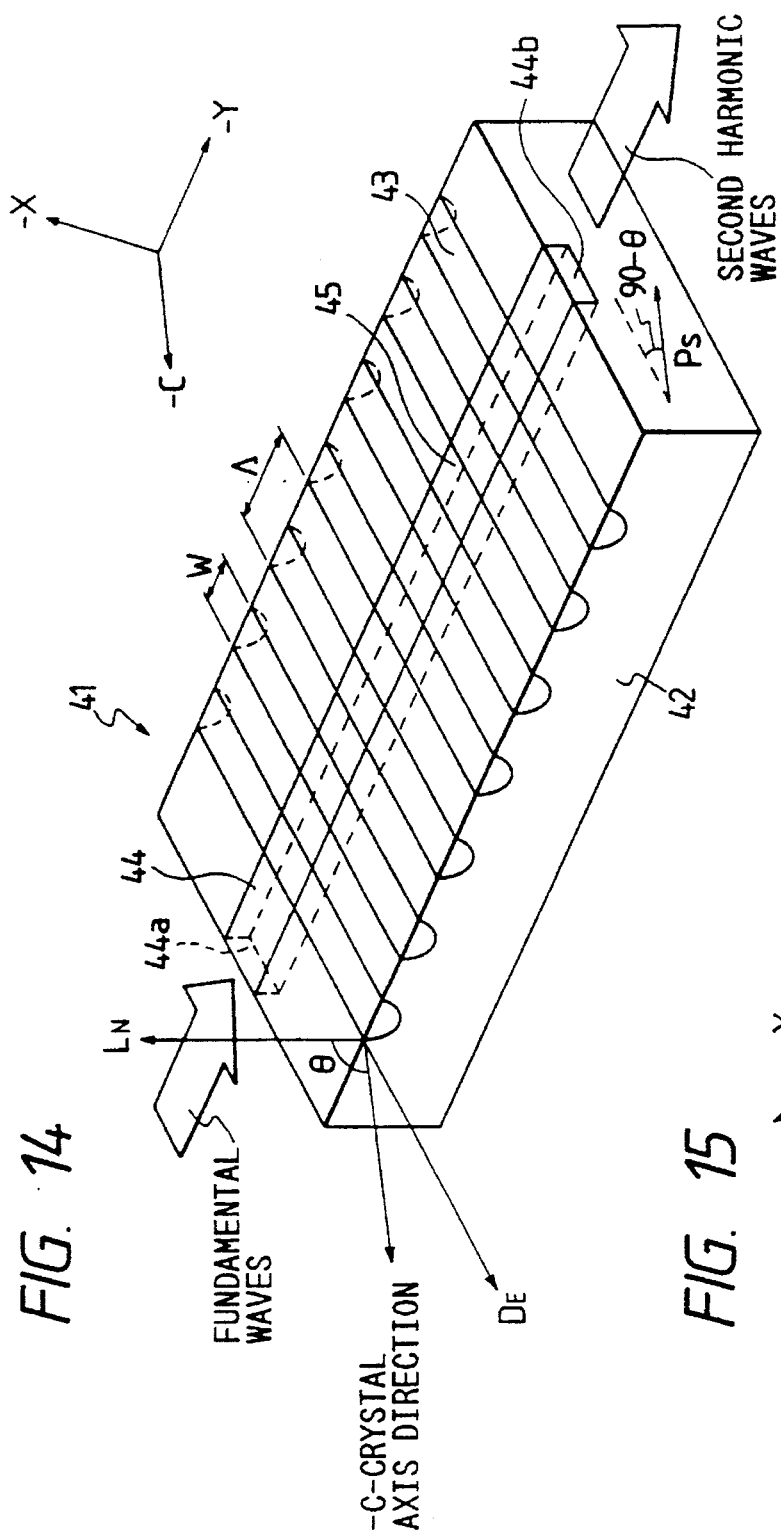
FIG. 14 is a constitutional diagonal view of an optical wavelength converting device according to a second embodiment of the present invention.

FIG. 14 is a constitutional diagonal view of an optical wavelength converting device according to a second embodiment of the present invention.

As shown in FIG. 14, an optical wavelength converting device 41 comprises a LiTaO$_3$ substrate 42 having an upper surface plane not parallel to the C-crystal axis, a plurality of inverted-polarization layers 43 periodically arranged in an upper surface region of the LiTaO$_3$ substrate 42 at regular intervals $\Lambda$ ($1 \leq \Lambda \leq 20$ µm), and an optical waveguide 44 arranged on a central upper surface region of the LiTaO$_3$ substrate 42 to cross alternate rows of the inverted-polarization layers 48 and non-inverted polarization layers 45 at right angles.

Figure 15:
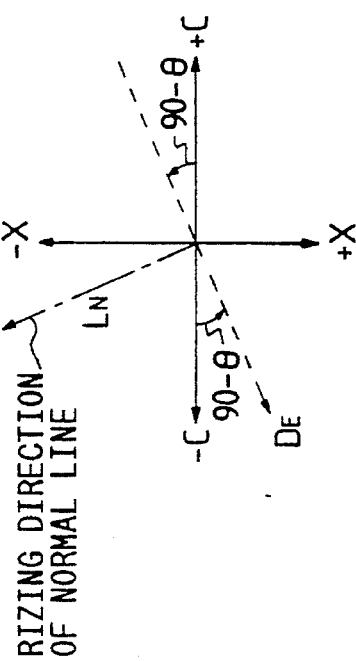
FIG. 15 schematically shows the inclination of a surface of the optical wavelength converting device to a C-crystal axis.

As shown in FIG. 15, the LiTaO$_3$ substrate 42 is formed by cutting out LiTaO$_3$ crystal along a peculiar plane inclined at an angle of 90-θ ($60 \leq \theta \leq 85$ degrees) degrees to the C-crystal axis toward the X-crystal axis, and a direction of a line L$_N$ normal to the upper surface of the LiTaO$_3$ substrate 42 is directed toward a middle direction between the –X-crystal axis direction and the –C-crystal axis direction. Also, the spontaneous polarization Ps of the LiTaO$_3$ substrate 41 is directed in the +C-crystal axis direction.

An extending direction D$_E$ of each inverted-polarization layer 43 is inclined at an angle of 90-θ degrees to the –C-crystal axis direction toward the +X-crystal axis direction, and the inverted-polarization layers 4 3 are arranged in series along the Y-crystal axis. A width W of each inverted-polarization layer 43 is W=Λ/2. Also, the inverted polarization of the inverted-polarization layers 43 is directed in the −C-crystal axis direction opposite to the direction of the spontaneous polarization Ps.

A refractive index of the optical waveguide 44 is higher than the LiTaO$_3$ substrate 42 to confine coherent light.

In the above configuration, coherent light consisting of fundamental waves is radiated to an incident end facet 44a of the optical waveguide 44, and the coherent light transmits through alternate rows of the inverted-polarization layers 43 and the non-inverted polarization layers 45. Thereafter, the fundamental waves are converted into the second harmonic waves in the optical waveguide 44, and the second harmonic waves converted are radiated from an output end facet 44b of the optical waveguide 44.

Next, a manufacturing method of the optical wavelength converting device 41 is described.

FIGS. 16A, 16B are cross sectional views of the LiTaO$_3$ substrate 42 showing a manufacturing method of the inverted-polarization layers 43.

Ta film deposited on the LiTaO$_3$ substrate 42 is patterned according to the lithography and the dry etching in the same manner as in the first embodiment. Thereafter, the LiTaO$_3$ substrate 42 is immersed in the dilute pyrophosphoric acid solution at a temperature of 260° C. for twenty minutes to periodically form a plurality of proton exchange layers 46 in the LiTaO$_3$ substrate 42 not covered with the patterned Ta film, as shown in FIG. 16A.

Thereafter, the LiTaO$_3$ substrate 42 with the proton exchange layers 46 is heated up at a rising rate of 50° C./second by radiating infrared rays to the LiTaO$_3$ substrate 42 with the infrared radiation heating apparatus according to the rapid thermal annealing method. Thereafter, the proton exchange layers 46 are thermally processed at a temperature ranging from 500° C. to 600° C. for thirty seconds to diffuse the H$^+$ ions existing in the proton exchange layers 46 into the LiTaO$_3$ substrate 42. Therefore, as shown in FIG. 16B, the inverted-polarization layers 43 are formed in the upper surface region of the LiTaO$_3$ substrate 42.

The reason that the inverted-polarization layers 43 are formed is described with reference to FIG. 17.

As shown in FIG. 17, when the LiTaO$_3$ substrate 42 is thermally heated, Li$^+$ ions of the LiTaO$_3$ substrate 42 are diffused into a proton exchange layer 46, and H$^+$ ions of the proton exchange layer 46 are diffused into the LiTaO$_3$ substrate 42. At this time, an internal electric field $E_7$ is induced in a boundary region between the LiTaO$_3$ substrate 42 and the proton exchange layer 46 because the diffusion speed of the H$^+$ ions is faster than that of Li$^+$ ions. The internal electric fields $E_7$ is directed parallel to the normal line $L_N$ from the LiTaO$_3$ substrate 42 to the the proton exchange layer 46. In this case, because the direction of the normal line $L_N$ is inclined at an angle of θ degrees to the −C-crystal axis direction, an intensity of a component electric field of the internal electric field $E_7$ directed in the −C-crystal axis direction is designated by E*cosθ. Where the symbol E denotes an intensity of the internal electric field $E_7$. Also, the spontaneous polarization Ps of the LiTaO$_3$ substrate 42 is directed in the +C-crystal axis direction. As a result, an electric field $E_c$ directed in an inverse direction to the direction of the spontaneous polarization Ps is substantially induced, and the intensity of the electric field Ec is E*cosθ. Therefore, an inverted-polarization kernel 47 is formed in the boundary region between the LiTaO$_3$ substrate 42 and the proton exchange layer 46. Thereafter, the inverted-polarization kernel 47 is growing toward the LiTaO$_3$ substrate 42 as the thermal processing of the proton exchange layer 46 is continued, and the inverted-polarization layers 43 are formed.

Figure 18:
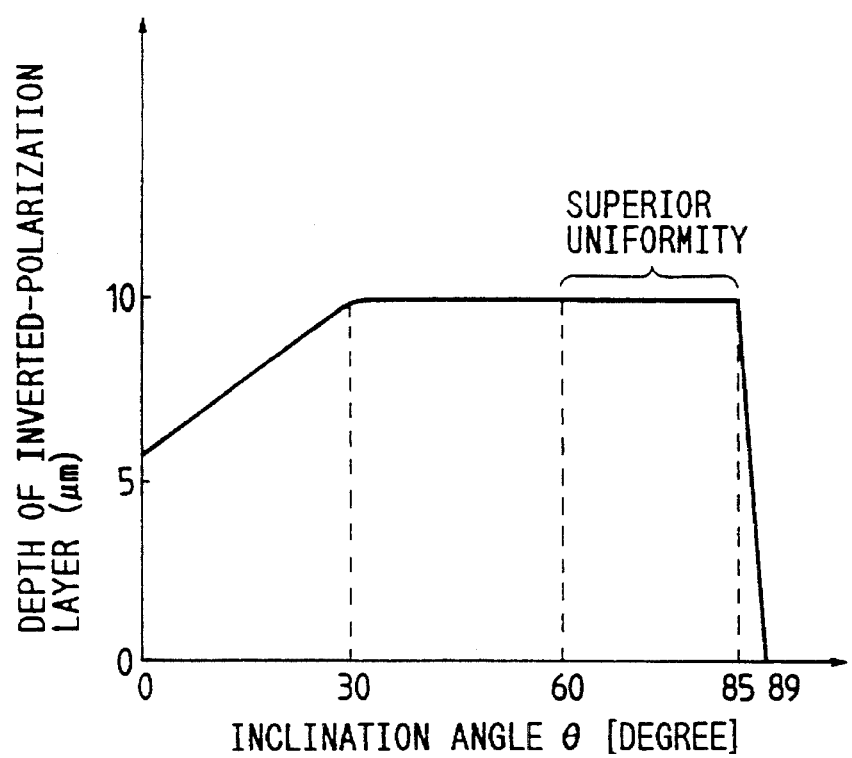
FIG. 18 graphically shows a relationship between an inclination angle θ shown in FIG. 15 and a depth of the inverted-polarization layer 43.

FIG. 18 graphically shows a relationship between the inclination angle θ and the depth of the inverted-polarization layer 43.

As shown in FIG. 18, in cases where the regular intervals of the inverted-polarization layers 43 are Λ=10 μm, the inverted-polarization layers 43 are formed when the inclination angle θ ranges from 0 degree to 89 degrees, and the relationship between the inclination angle θ and the depth of the inverted-polarization layer 43 are measured. The depth of the inverted-polarization layers at the inclination angle θ=0 is equivalent to that in the conventional optical wavelength converting device 18. In cases where the inclination angle θ is lower than 30 degrees, the depth of the inverted-polarization layers 43 becomes lower as the inclination angle θ is lower. The reason is that the diffusion speed of the H$^+$ ions in the C-crystal axis is a ratio 1/1.5 lower than that of the H$^+$ ions in other crystal axes. In addition, in cases where the inclination angle θ is set to a range from 60 degrees to 85 degrees, the inverted-polarization layers 43 are uniformly formed.

Figure 19A:
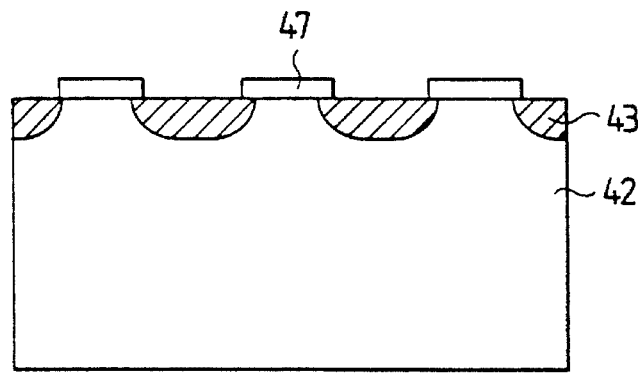
FIGS. 19A, 19B are cross sectional views of inverted-polarization layers, showing the inverted-polarization layers periodically formed in FIG. 19A, and showing the inverted-polarization layers connected each other in FIG. 19B.
Figure 19B:
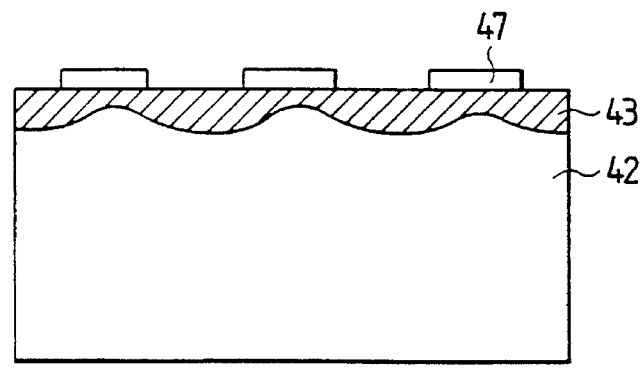

FIGS. 19A, 19B are cross sectional views of the inverted-polarization layers 43, showing the inverted-polarization layers 43 periodically formed in FIG. 19A, and showing the inverted-polarization layers 43 connected each other in FIG. 19B.

The formation of the inverted-polarization layers 43 is performed by continuing the thermal processing on condition that the regular intervals of patterned Ta films 47 are Λ=10 μm. As shown in FIG. 19A, in cases where the thermal processing of the proton exchange layer 46 is continued at a temperature of 540° C. for ten seconds, the inverted-polarization layers 43 periodically arranged are formed. However, in cases where the thermal processing of the proton exchange layer 46 is continued at a temperature of 540° C. for sixty seconds, as shown in FIG. 19B, the inverted-polarization layers 43 formed are connected to each other because the inverted-polarization layers 43 extend in a horizontal direction as the thermal processing is continued.

Also, in cases where the LiTaO$_3$ substrate 42 with the proton exchange layer 46 is heated up at a rising rate of about 1° C./second in a furnace in the same manner as in the conventional manufacturing method before the thermal processing of the proton exchange layer 46 is continued at a temperature ranging from 450° C. to a Curie temperature 604° C. of the LiTaO$_3$ substrate 42, the inverted-polarization layers 43 are also formed. However, uniformity of the inverted-polarization layers 43 considerably deteriorates. Also, various depths of the inverted-polarization layers 43 are less than 1 μm. The reason that the depths of the inverted-polarization layers 43 are shallow is as follows, because the LiTaO$_3$ substrate 42 with the proton exchange layer 46 is gradually heated up at the rising rate of about 1° C./second, the proton exchange layer 46 is too enlarged until the proton exchange layer 46 is heated up to the temperature of 450° C. Therefore, the density of the H$^+$ ions diffused is lowered, and the intensity of the internal electric field induced is decreased. Accordingly, the depths of the inverted-polarization layers 43 become shallow.

As a result of various experiments, the inverted-polarization layers 43 periodically arranged can be formed on condition that the rising rate of the LiTaO$_3$ substrate 42 with the proton exchange layer 46 is equal to or more than 10° C./second and the thermal processing of the proton exchange layer 46 is finished within for sixty seconds.

In addition, because the inverted-polarization layers 43 extend in a horizontal direction as the thermal processing is continued, the width W of the inverted-polarization layers 43 is limited to 10 µm or less to uniformly form the inverted-polarization layers 43.

For example, the inclination angle θ ranges from 60 degrees to 85 degrees, the regular intervals of the inverted-polarization layers 43 are set to Λ=4 µm, The LiTaO$_3$ substrate 42 is immersed in the dilute pyrophosphoric acid solution at a temperature of 260° C. for ten minutes to form the proton exchange layers 46, and the thermal processing of the proton exchange layer 46 is continued at a temperature of 540° C. for ten seconds. In this case, the depth of the inverted-polarization layers 43 periodically arranged reaches 2.8 µm. The depth of 2.8 µm obtained according to the second embodiment is about 1.4 times larger than that in the conventional manufacturing method.

Thereafter, the optical waveguide 44 is formed in the LiTaO$_3$ substrate 42 with the inverted-polarization layers 43 periodically arranged in the same manner as in the first embodiment.

Accordingly, because a depth direction of the inverted-polarization layers 43 is directed in the middle direction between the +X-crystal axis direction and the C-crystal axis direction, the growth of the inverted-polarization layers 43 in the depth direction can be enhanced. Therefore, even though the regular intervals Λ of the inverted-polarization layers 43 are shortened, the inverted-polarization layers 43 can be deepened without connecting the inverted-polarization layers 43 to each other. As a result, the coherent light consisting of fundamental waves can be efficiently converted into second harmonic waves because a ratio of the fundamental waves not transmitting through the inverted-polarization layers 43 is decreased.

Also, because the proton exchange layers 46 are rapidly heated up and are thermally processed according to the infrared heating, the inverted-polarization layers 43 periodically arranged can be formed at high speed without connecting the inverted-polarization layers 43 to each other.

In the second embodiment, the normal line $L_N$ of the upper surface of the LiTaO$_3$ substrate 42 is perpendicular to the Y-crystal axis. However, the second embodiment is not limited to the normal line $L_N$ perpendicular to the Y-crystal axis. That is, it is applicable that the upper surface of the LiTaO$_3$ substrate 42 have any normal line of which a rising direction is inclined at an angle of θ degrees to the −C-crystal axis direction toward X-Y crystalline plane defined as (001) crystalline plane in Miller indices.

Also, the extending direction $D_E$ of the inverted-polarization layer 43 is parallel to X-C crystalline plane defined as (010) crystalline plane in Miller indices. However, as shown in FIG. 20, it is applicable that the extending direction $D_E$ of the inverted-polarization layer 43 is further inclined at an angle of α degrees ($6 \leq \alpha \leq 174$ degrees) to the X-C crystalline plane toward the +Y-crystal axis direction or the −Y-crystal axis direction according to the concept of the present invention described in the first embodiment.

Also, pure LiTaO$_3$ crystal is utilized as one of the ferroelectric substance in the second embodiment. However, LiTaO$_3$ crystal doped by MgO, Nb, or Nd is also applicable. In addition, pure LiNbO$_3$ crystal or LiNbO$_3$ crystal doped by MgO, Ta, or Nd is applicable.

Also, the infrared radiation heating apparatus is utilized to thermally process the proton exchange layer 46. However, a heating apparatus for rapidly heating the proton exchange layer 46 according to the rapid thermal annealing method is not limited to the infrared radiation heating apparatus. For example, a flash lamp heating apparatus or a CO$_2$ laser heating apparatus is applicable to rapidly heat the proton exchange layer 46.

Also, the dilute pyrophosphoric acid solution is utilized to form the proton exchange layers 46 in the second embodiment. However, a dilute phosphoric acid solution obtained by mixing phosphoric acid such as orthophosphoric acid (H$_2$PO$_4$) with the lithium phosphate is applicable in place of the dilute pyrophosphoric acid solution.

Also, the pyrophosphoric acid solution is diluted by the lithium phosphate to form the dilute pyrophosphoric acid solution in the second embodiment. However, diluent is not limited to the lithium phosphate. That is, any base including lithium such as benzoic lithium (LiCH$_3$COOH) is applicable as the diluent.

Also, the Ta film 47 is utilized to protect Li$^+$ ions of the LiTaO$_3$ substrate 42 from being exchanged for H$^+$ ions in the second embodiment. However, a film having acid resisting properties such as a Ta$_2$O$_5$ film, a Pt film, a Au film, or a W film is applicable in place of the Ta film 47.

Also, the proton exchange optical waveguide 44 is formed by exchanging Li$^+$ ions of the inverted-polarization and non-inverted polarization layers 43, 45 for H$^+$ ions. However, Ti diffusing optical waveguide, Nb diffusing optical waveguide, or ion injecting optical waveguide is applicable in place of the optical waveguide 44.

(Third Embodiment)

The reason that an optical waveguide extends along the Y-crystal axis to convert fundamental waves into second harmonic waves at high efficiency in an optical wavelength converting device is initially described.

1. Polarization Direction of Coherent Light Transmitting Through an Optical Waveguide High non-linear optic crystal such as LiTaO$_3$ has generally a high non-linear optic constant C$_{33}$ in a d$_{33}$ direction denoting the +C-crystal axis direction of the crystal. The optic constant C$_{33}$ indicates a non-linear inversion constant with which a conversion efficiency of fundamental waves having electric field directed in the C-crystal axis into second harmonic waves having electric field directed in the same direction is determined. Therefore, in cases where fundamental waves of coherent light transmitting through the optical waveguide has electric field directed in the C-crystal axis, the conversion efficiency is maximized. Accordingly, it is required that coherent light transmitting through the optical waveguide has electric field directed in the C-crystal axis of the crystal.

2. Confinement of Coherent Light in an Optical Waveguide

A relative refractive index of a proton exchanged optical waveguide to a non-linear optic crystal substrate anisotropically changes. Therefore, coherent light having electric field directed in the C-crystal axis of the substrate is strongly confined in the optical waveguide. Accordingly, to strongly confine the coherent light in the optical waveguide, it is required that coherent light transmitting through the optical waveguide has electric field directed in the C-crystal axis of the substrate.

3. Coupling of a Semiconductor Laser With the Optical Wavelength Converting Device 31, or 41 at High Efficiency As shown in FIG. 21A, because coherent light radiated from a semiconductor laser is polarized in the transverse electric mode (TE mode) to enhance an oscillating efficiency of the coherent light, electric field induced by the coherent light is directed in a lateral direction of the semiconductor laser. Also, the electric field is distributed in an elliptic shape. A major axis of the electric field distribution is directed in the lateral direction, and a minor axis of the electric field distribution is directed in a vertical direction. To couple the semiconductor laser with an optical wavelength converting device at high efficiency, it is required that not only the electric field is directed in the C-crystal axis of the substrate but also the major axis of the electric field distribution is directed in parallel to a major side of an incident end facet formed in a rectangular shape. For example, the major axis of the electric field distribution is not directed in parallel to the major side of the incident end facet, intensity of the coherent light transmitting through an optical waveguide of the device is considerably reduced, so that intensity of second harmonic waves converted in the optical waveguide is considerably reduced even though the electric field is directed in the C-crystal axis of the substrate.

Therefore, in cases where any polarizer for changing the polarization direction of the electric field polarized in the TE mode is not utilized, it is required that coherent light polarized in the TE mode transmits through an optical waveguide of the device, as shown in FIG. 21B.

Accordingly, as shown in FIGS. 5, 14, the optical waveguide 34 (or 44) extends along the Y-crystal axis to arrange the alternate rows of the inverted-polarization layers 33 (or 43) and the non-inverted polarization layers 35 (or 45) in a direction perpendicular to the C-crystal axis, so that the coherent light can transmit through the alternate rows of the optical waveguide 34 (or 44) in the TE mode.

Next, preferred embodiments of a shorter wavelength coherent light generating apparatus with the optical wavelength converting device 31 or 41 according to the present invention are described with reference to drawings.

FIG. 22 is a constitutional view of a shorter wavelength coherent light generating apparatus according to a third embodiment.

As shown in FIG. 22, a shorter wavelength coherent light generating apparatus 51 comprises a semiconductor laser 52 for radiating coherent light consisting of fundamental waves of 870 nm wavelength, a coherent light converging system 53 for converging the coherent light without utilizing any polarizer, and the optical wavelength converting device 31 for converting the fundamental waves of the coherent light into second harmonic waves of 435 nm wavelength.

In the above configuration, coherent light radiated from the semiconductor laser 52 is converged at the incident end facet 34a of the optical waveguide 34 by the coherent light converging system 53. In this case, the coherent light polarized in the TE mode is incident on the optical waveguide 34 without being changed to any other mode. Because the coherent light polarized in the TE mode can transmit through the optical waveguide 34, the semiconductor laser 52 is coupled with the device 31 at high coupling efficiency, so that the coherent light polarized in the TE mode is converted into second harmonic waves in the optical waveguide 34 at high conversion efficiency. That is, electric field induced by the coherent light is directed in the C-crystal axis while the coherent light transmits through the optical waveguide 34. When the coherent light having an output power of 70 mW is radiated from the semiconductor laser 52, the coherent light transmitting through the optical waveguide 34 has a transmitting power of 42 mW. Therefore, the coupling efficiency is 60%. In the conventional device 18 shown in FIG. 4, the coupling efficiency is no more than 45% because the coherent light polarized in the TE mode is required to be changed to the TM mode in the polarizer 24. The outgoing power output from the output end facet 34b of the optical waveguide 34 is 3 mW.

Accordingly, because any polarizer is not required in the coherent light converging system 53, the configuration of the shorter wavelength coherent light generating apparatus 51 can be simplified. Also, the outgoing power of the second harmonic waves can be increased because the coupling efficiency is enhanced.

(Fourth Embodiment)

Figure 23:
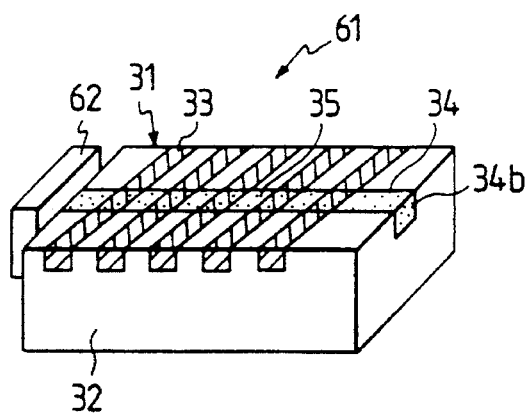
FIG. 23 is a constitutional view of a shorter wavelength coherent light generating apparatus according to a fourth embodiment.

FIG. 23 is a constitutional view of a shorter wavelength coherent light generating apparatus according to a fourth embodiment.

As shown in FIG. 23, a shorter wavelength coherent light generating apparatus 61 comprises the optical wavelength converting device 31 and a semiconductor laser 62 directly attached to the inlet end facet 34a of the optical waveguide 34 for radiating coherent light consisting of fundamental waves of 860 nm wavelength.

In the above configuration, because coherent light radiated from the semiconductor laser 62 is in the TE mode, the direction of electric field induced by the coherent light is in parallel to the C-crystal axis. Also, a major axis of an electric field distribution is directed in a major side of the incident end facet 34a.

Therefore, in cases where the coherent light having a wavelength of 860 nm is radiated from the semiconductor laser 62 at an output power of 70 mW, a transmitting power of the coherent light transmitting through the optical waveguide 34 is 35 mW. That is, a coupling efficiency is 50%. In the conventional apparatus 21, the coupling efficiency is 10% or less. Therefore, the coupling efficiency is greatly improved. Also, an outgoing power of the second harmonic waves is 2 mW.

Accordingly, the coherent light can transmit through the optical waveguide 34 at high coupling efficiency. Also, because any optical system is not arranged between the semiconductor laser 62 and the device 31, the coherent light radiated from the semiconductor laser 62 can be efficiently radiated to the incident end facet 34a. Also, the configuration of the shorter wavelength coherent light generating apparatus 61 can be simplified because any optical system is not arranged.

Therefore, in cases where the apparatus 61 is utilized as a shorter wavelength light source for an optical disk or a laser printer, a storing capacity of information written in the optical disk can be greatly increased. Also, the laser printer can be manifactured in a small size.

(Fifth Embodiment)

Figure 24:
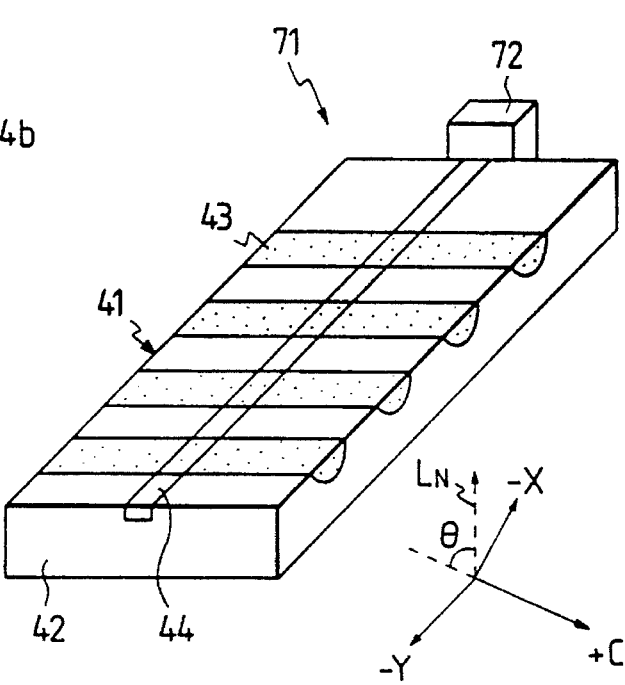
FIG. 24 is a constitutional view of a shorter wavelength coherent light generating apparatus according to a fifth embodiment.

FIG. 24 is a constitutional view of a shorter wavelength coherent light generating apparatus according to a fifth embodiment.

As shown in FIG. 24, a shorter wavelength coherent light generating apparatus 71 comprises the optical wavelength converting device 41 and a semiconductor laser 72 attached to the inlet end facet 44a of the optical waveguide 44 for radiating coherent light consisting of fundamental waves.

LiTaO$_3$ crystal has a non-linear optic constant C$_{33}$ in the d$_{33}$ direction. However, because the normal line L$_N$ of the device 41 is inclined at an angle of θ degrees to the −C-crystal axis direction, a non-linear optic constant C$_{EFF}$ effectively functioning for the coherent light transmitting through the optical waveguide 44 is equal to C$_{33}$*sin(θ). Also, though a difference in refractive index between the optical waveguide 44 and the LiTaO$_3$ substrate 42 is Δn, a refractive index difference effectively functioning for the coherent light transmitting through the optical waveguide 44 is equal to Δn*sin(θ). Therefore, when the inclination angle θ is 90 degrees, the effective non-linear optic constant C$_{EFF}$=C$_{33}$*sin(θ) and the effective refractive index difference Δn*sin(θ) are maximized together.

Figure 25:
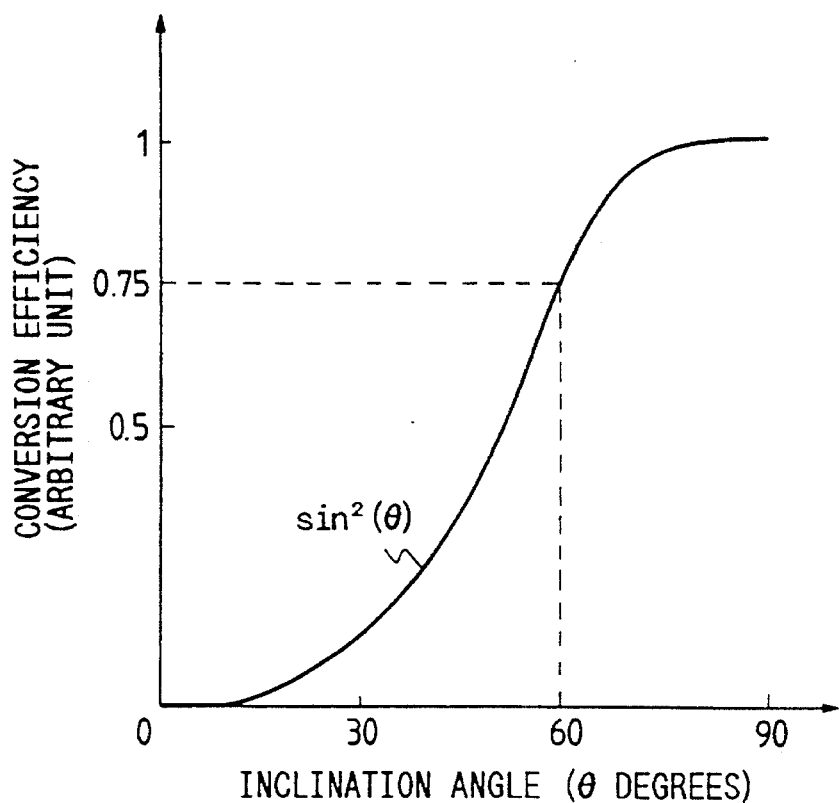
FIG. 25 graphically shows a relationship between an inclination angle θ and a conversion efficiency.

As a result, as shown in FIG. 25, the conversion efficiency of the fundamental waves into the second harmonic waves changes in proportion to sin$^2$(θ). In cases where the conversion efficiency is required to be 75% of or more than a maximum conversion efficiency (θ=90 degrees), the inclination angle θ is required to be set to 60 degrees or more. Also, in cases where the inclination angle θ is more than 85 degrees, the inverted-polarization layers 43 cannot be formed. Therefore, the inclination angle θ is limited to a range 60 degrees ≦θ≦85 degrees.

In the above configuration, coherent light radiated from the semiconductor laser 72 transmits through the optical waveguide 44 while remaining the polarization of the coherent light to the TE mode. Therefore, electric field induced by the coherent light is directed in the C-crystal axis in the optical waveguide 44. Thereafter, fundamental waves of the coherent light are converted into second harmonic waves at a conversion efficiency of 75% or more, and the second harmonic waves are output from the output end facet 44b of the optical waveguide 44.

Accordingly, because any optical system for changing the mode of the coherent light and converging the coherent light is not required, the shorter wavelength coherent light generating apparatus 71 can be simplified. Also, because the inclination angle θ is limited to the range 60 degrees≦θ≦ 85 degrees, the fundamental waves can be converted into the second harmonic waves at high conversion efficiency.

(Sixth Embodiment)

A shorter wavelength coherent light generating apparatus in which fundamental waves are stably converted and an outgoing power of second harmonic waves converted is stabilized is described.

An oscillating wavelength of coherent light radiated from a semiconductor laser fluctuates because an injecting current supplied to the semiconductor laser or ambient temperature changes. For example, the influence of the ambient temperature on the oscillating wavelength is 0.2 to 0.8 nm/° C. In addition, the fluctuation of the oscillating wavelength does not continuously occur but discretely occurs because the fluctuation of the oscillating wavelength occurs with a change of an oscillating mode in the semiconductor laser. The oscillating wavelength changes by 0.2 to 0.8 nm because of the change of the oscillating mode. Also, the fluctuation of the oscillating wavelength caused by the change of the injecting current discretely occurs in the same reason. Furthermore, the change of the oscillating mode is caused by receiving a returning light reflected from an optical wavelength converting device to the semiconductor laser. In contrast, a permissible variation of the oscillating wavelength required to convert the fundamental waves into the second harmonic waves in the optical wavelength converting device is in a range of 0.1 nm or 0.2 nm. Therefore, when the oscillating mode changes, the quasi-phase-matching condition is not satisfied, so that an outgoing power of the second harmonic waves is considerably reduced. To avoid the reduction of the outgoing power of the second harmonic waves, the fluctuation of the oscillating wavelength is required to be lowered within the permissible variation.

In a sixth embodiment, a series of grating is arranged on an optical wavelength converting device to fix the oscillating wavelength while selectively reflecting the coherent light having a particular wavelength.

Figure 26:
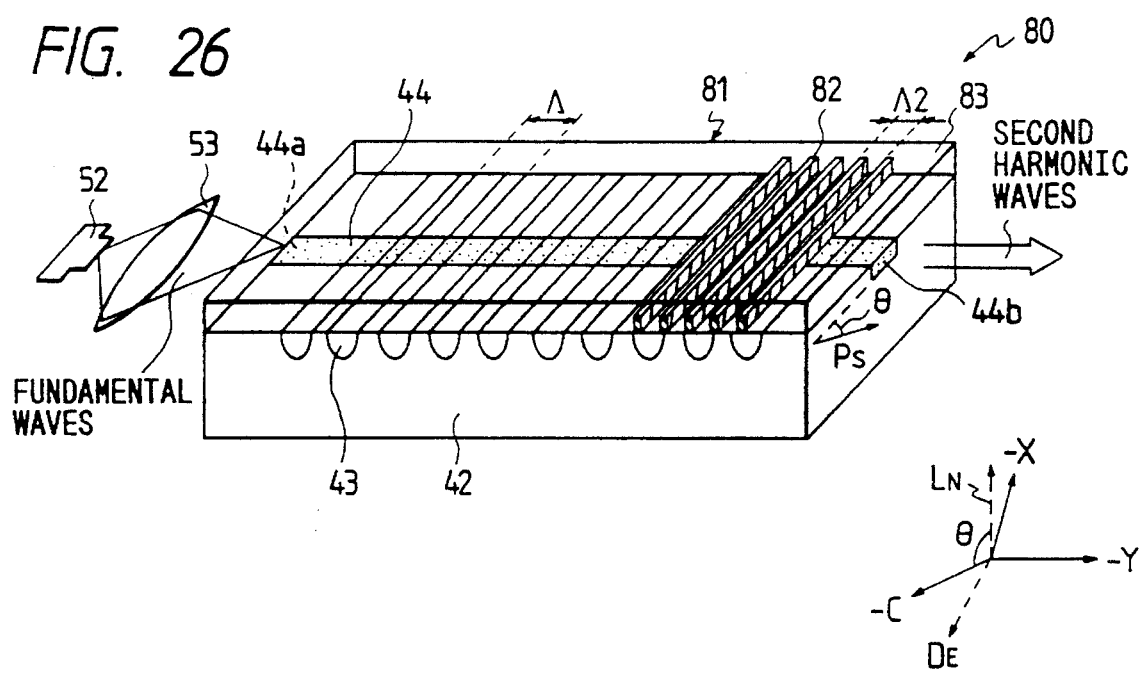
FIG. 26 is a diagonal perspective view of a shorter wavelength coherent light generating apparatus according to a sixth embodiment of the present invention.

FIG. 26 is a diagonal perspective view of a shorter wavelength coherent light generating apparatus according to the sixth embodiment of the present invention.

As shown in FIG. 26, a shorter wavelength coherent light generating apparatus 80 comprises the semiconductor laser 52, the coherent light converging system 53, and an optical wavelength converting device 81 for reflecting coherent light radiated from the semiconductor laser 52 to fix a wavelength λ$_f$ of the coherent light and converting fundamental waves of the coherent light into second harmonic waves. The optical wavelength converting device 81 comprises the LiTaO$_3$ substrate 42, the inverted-polarization layers 43, the optical waveguide 44, a series of gratings 82 periodically arranged on the LiTaO$_3$ substrate 42 and the inverted-polarization layers 43 at second regular intervals Λ2 for reflecting the coherent light transmitting through the optical waveguide 44, and a covering layer 83 arranged on the gratings 82 for protecting the gratings 82.

The regular intervals Λ of the inverted-polarization layers 43 are 3.9 μm, and the second regular intervals Λ2 of the gratings 82 are 0.4 μm. Also, each of the gratings 82 has a height of 0.2 μm, a length of 1 mm, and a width of 0.1 μm (or, a duty ratio is 3:1). In addition, the gratings 82 are made of a photoresist material (manufactured by Shiply Ltd., and product No. AZ1400-17) which is a radiation-sensitive compound and a soft material having high workability. A refractive index of the gratings 82 is 1.5.

The covering layer 83 is made of Ta$_2$O$_5$ of which an effective refractive index is equal to 2.0. Because the covering layer 83 is arranged between the gratings 82, the change of the effective refractive index is generated in a periodic structure consisting of the gratings 82 and the covering layer 83. Therefore, the periodic structure is equivalent to a diffraction grating, and the periodic structure functions as a distributed Bragg reflector (DBR) on condition that a DBR condition formulated by an equation Λ2=m*λ$_f$/(2N) is satisfied. Where the symbol m denotes order of the diffraction grating and the symbol N denotes an average refractive index of the gratings 82 and the covering layer 83.

Because a refractive difference in the effective refractive index between the gratings 82 and the covering layer 83 is large, a reflection efficiency of the periodic structure for the coherent light becomes large. Therefore, the combination of the gratings 82 made of the photoresist and the covering layer 83 made of Ta$_2$O$_5$ effectively functions as the diffraction grating.

A reflection efficiency of the periodic structure is generally increased in proportional to the height of the gratings 82 and the refractive difference in the effective refractive index. Also, because the grating order of the gratings 82 is proportional to the second regular intervals Λ2 of the gratings 82, the reflection efficiency is inversely proportional to the second regular intervals Λ2.

Next, a manufacturing method of the optical wavelength converting device 81 is described.

Figure 27A:
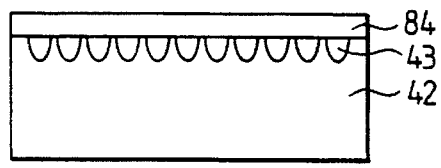
FIGS. 27A to 27C are diagonal views showing a manufacturing method of the optical wavelength converting device shown in FIG. 26.
Figure 27B:
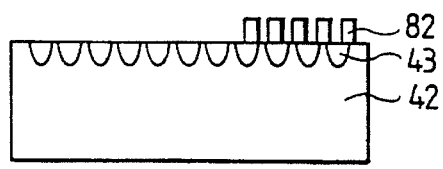
Figure 27C:
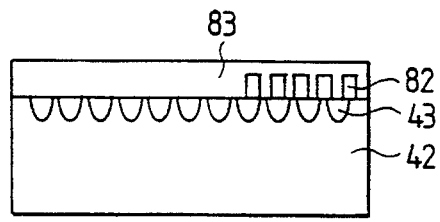

FIGS. 27A to 27C are diagonal views showing a manufacturing method of the optical wavelength converting device 81 shown in FIG. 26.

As shown in FIG. 27A, after the inverted-polarization layers 43 and the optical waveguide 44 are formed in the LiTaO$_3$ substrate 42, diluted photoresist 84 (AZ1400-17) is coated over the optical waveguide 53. The thickness of the photoresist 84 coated is 0.2 µm. Thereafter, grating pattern areas of the photoresist 84 are exposed to 0.4416 nm wavelength light radiated from He—Cd laser according to an interference-exposure process to transfer a grating pattern to the photoresist 84. Therefore, the photoresist 84 exposed becomes soluble in a developer solution. Thereafter, the photoresist 84 is immersed in the developer solution to develop the photoresist 84. Therefore, the grating patterned areas of the photoresist 84 exposed are removed. Therefore, photoresist portions formed in the grating pattern are arranged on the optical waveguide 53. Thereafter, the photoresist portions are cured so that the gratings 82 crossing over the optical waveguide 53 are formed, as shown in FIG. 27B. The second regular intervals Λ2 of the gratings 82 periodically arranged are set to 0.4 µm, a grating height is set to 0.2 µm, a ratio of the grating width W1 to the regular intervals Λ1 is set to 0.25, a length of each of the gratings 82 in the extending direction $D_E$ is set to 1 mm, and a total length of the gratings 82 in the Y-crystal axis direction is set to 0.5 mm.

Thereafter, as shown in FIG. 27C, Ta$_2$O$_5$ is deposited over the gratings 82 with a sputtering method to form the covering layer 83. The height of the covering layer 83 deposited on the gratings 82 is 0.3 µm in thickness. Therefore, the covering layer 83 protects the gratings 82 from the atmosphere.

Figure 28:
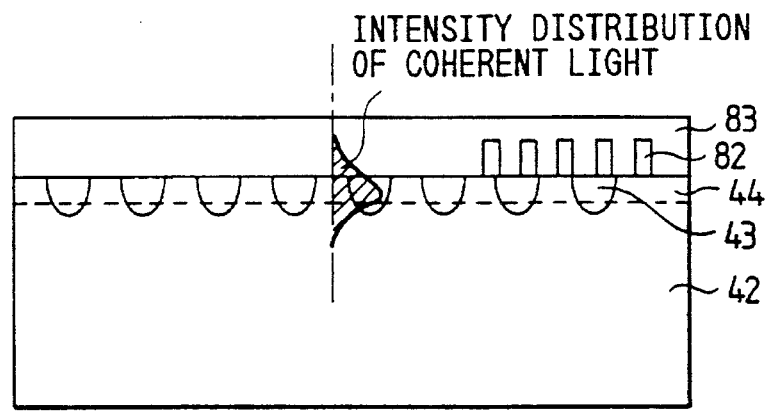
FIG. 28 is a cross-sectional view of the optical wavelength converting device shown in FIG. 26, illustrating intensity distribution of coherent light transmitting through an optical waveguide.

FIG. 28 is a cross-sectional view of the optical wavelength converting device 81 shown in FIG. 26, illustrating intensity distribution of coherent light transmitting through the optical waveguide 44.

In the above configuration of the shorter wavelength coherent light generating apparatus 80, as shown in FIG. 28, coherent light radiated from the semiconductor laser 52 transmits through the optical waveguide 44 and is reflected by the periodic structure of the gratings 82 and the covering layer 83 on condition that the DBR condition Λ2=m* λ$_f$/(2N) is satisfied. In cases where the wavelength λ$_f$ of the coherent light is 860 nm, the DBR condition is satisfied in the second order (m=2) of the diffraction grating. Thereafter, the coherent light reflected is returned to the semiconductor laser 52, and the oscillating wavelength of the coherent light is fixed to 860 nm. Thereafter, coherent light of which the wavelength is fixed to 860 nm is radiated from the semiconductor laser 52 to the optical waveguide 44, and fundamental waves of the coherent light is converted into second harmonic waves having a shorter wavelength λ$_n$ of 430 nm.

Next, optical characteristics of the shorter wavelength coherent light generating apparatus 80 are described.

When the coherent light having an output power of 70 mW is radiated to the optical waveguide 44, a transmitting power of the coherent light is 42 mW. Therefore, a coupling efficiency is 60%. Also, 30% of the coherent light transmitting through the optical waveguide 44 is reflected by the periodic structure of the gratings 82 and the covering layer 83, and an outgoing power of the second harmonic waves is 3 mW.

Accordingly, because the normal line $L_N$ of the optical wavelength converting device 81 is inclined to the C-crystal axis, any polarizer is not required so that the shorter wavelength coherent light generating apparatus 80 can be manufactured in a small size. Also, the coupling efficiency and conversion efficiency are improved, and a large power of the second harmonic waves can be obtained.

The stabilization of the intensity of the second harmonic waves is described with reference to FIG. 29.

Figure 29:
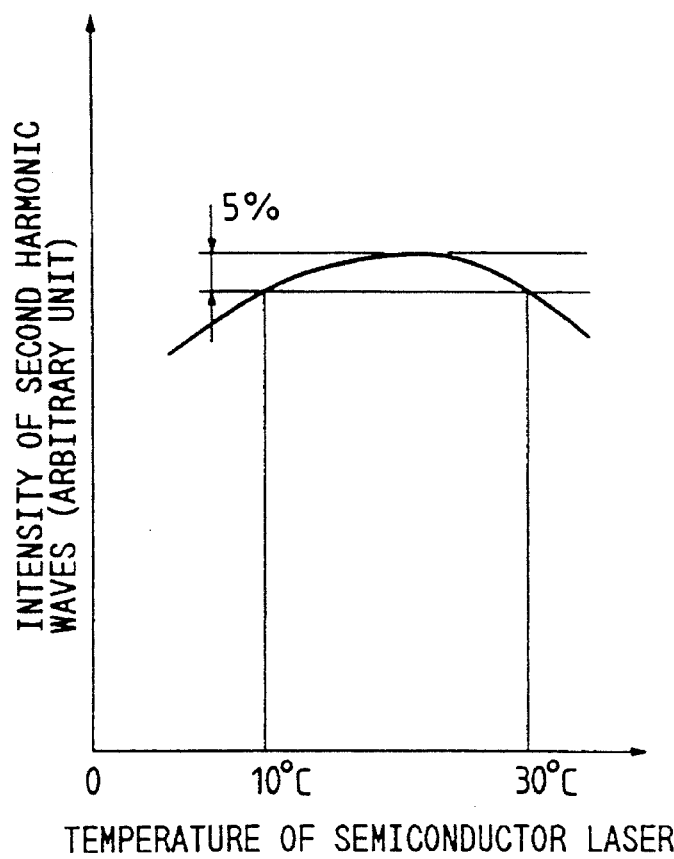
FIG. 29 graphically shows a relation between the intensity of the second harmonic waves and a temperature of the semiconductor laser.

FIG. 29 graphically shows a relation between the intensity of the second harmonic waves and a temperature of the semiconductor laser 52.

As shown in FIG. 29, even though a temperature of the semiconductor laser 52 is changed in a range from 10° to 30° C., the fluctuation of the intensity of the second harmonic waves is restrained within 5% of a maximum intensity at a temperature of 20° C.

Accordingly, the second harmonic waves can be stably obtained in the shorter wavelength coherent light generating apparatus 80 regardless of the fluctuation of the ambient temperature or the injecting current to the semiconductor laser 52.

In the sixth embodiment, the gratings 82 are arranged in the neighborhood of the output end facet 44b of the optical waveguide 44. However, the position of the gratings 82 is not limited in the neighborhood of the output end facet 44b. For example, it is applicable that the gratings 82 be arranged in the neighborhood of the incident end facet 44a of the optical waveguide 44.

Also, the shorter wavelength coherent light generating apparatus 80 is manufactured by utilizing the optical wavelength converting device 41 according to the second embodiment. However, the concept of the invention described in the sixth embodiment is not limited to the second embodiment. That is, it is available that the shorter wavelength coherent light generating apparatus 80 be manufactured by utilizing the optical wavelength converting device 31 according to the first embodiment.

(Seventh Embodiment)

Figure 30:
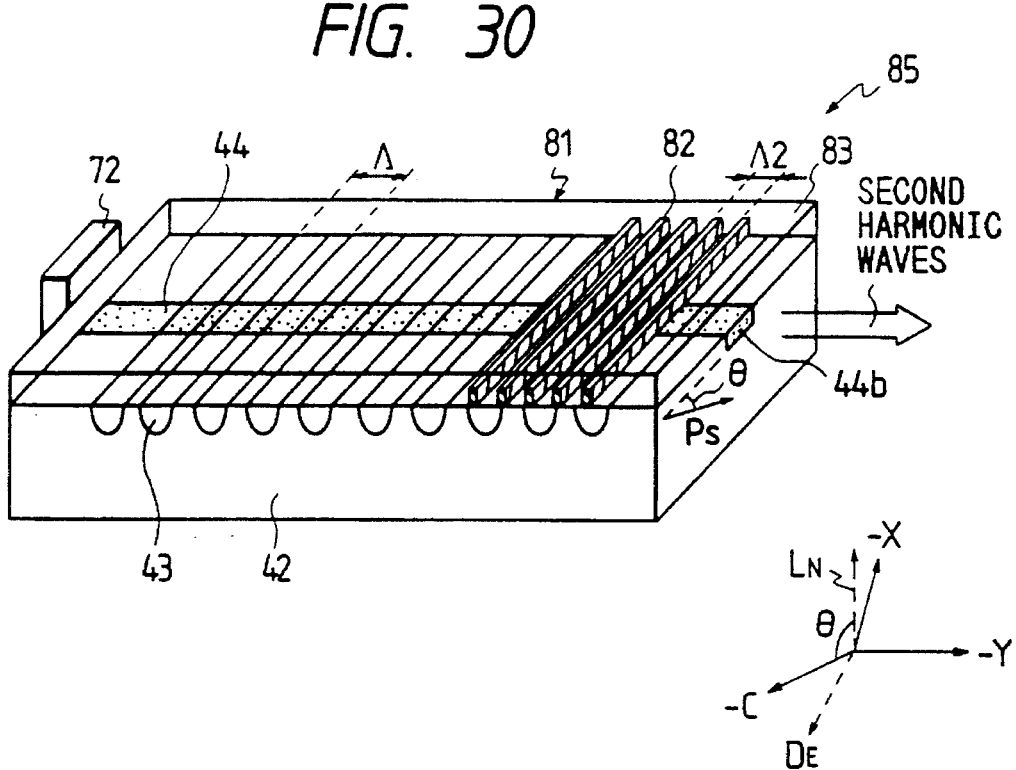
FIG. 30 is a diagonal perspective view of a shorter wavelength coherent light generating apparatus according to a seventh embodiment of the present invention.

FIG. 30 is a diagonal perspective view of a shorter wavelength coherent light generating apparatus according to a seventh embodiment of the present invention.

As shown in FIG. 30, a shorter wavelength coherent light generating apparatus 85 comprises the optical wavelength converting device 81 and the semiconductor laser 72 directly attached to the inlet end facet 44a of the optical wavelength converting device 81. An anti-reflection layer is coated on the inlet end facet 44a to prevent coherent light radiated from the semiconductor laser 72 from being reflected at the inlet end facet 44a.

In the above configuration, a coupling efficiency denoting a ratio of the intensity of coherent light radiated from the semiconductor laser 72 to the intensity of the coherent light transmitting through the optical waveguide 44 is increased to 80% because the semiconductor laser 72 is directly attached to the inlet end facet 44a of the device 81. Also, intensity of coherent light reflected at the inlet end facet 44a is only 0.01% of the intensity of coherent light radiated from the semiconductor laser 72 because the anti-reflection layer is coated on the inlet end facet 44a.

When the coherent light having an output power of 70 mW is radiated to the optical waveguide 44, an outgoing power of the second harmonic waves is increased to 10 mW as compared with in the sixth embodiment.

Accordingly, the second harmonic waves can be obtained at high coupling efficiency.

In the seventh embodiment, the shorter wavelength coherent light generating apparatus 85 is manufactured by utilizing the optical wavelength converting device 41 according to the second embodiment. However, the concept of the invention described in the seventh embodiment is not limited to the second embodiment. That is, it is available that the shorter wavelength coherent light generating apparatus 85 be manufactured by utilizing the optical wavelength converting device 31 according to the first embodiment.

(Eighth Embodiment)

Figure 31:
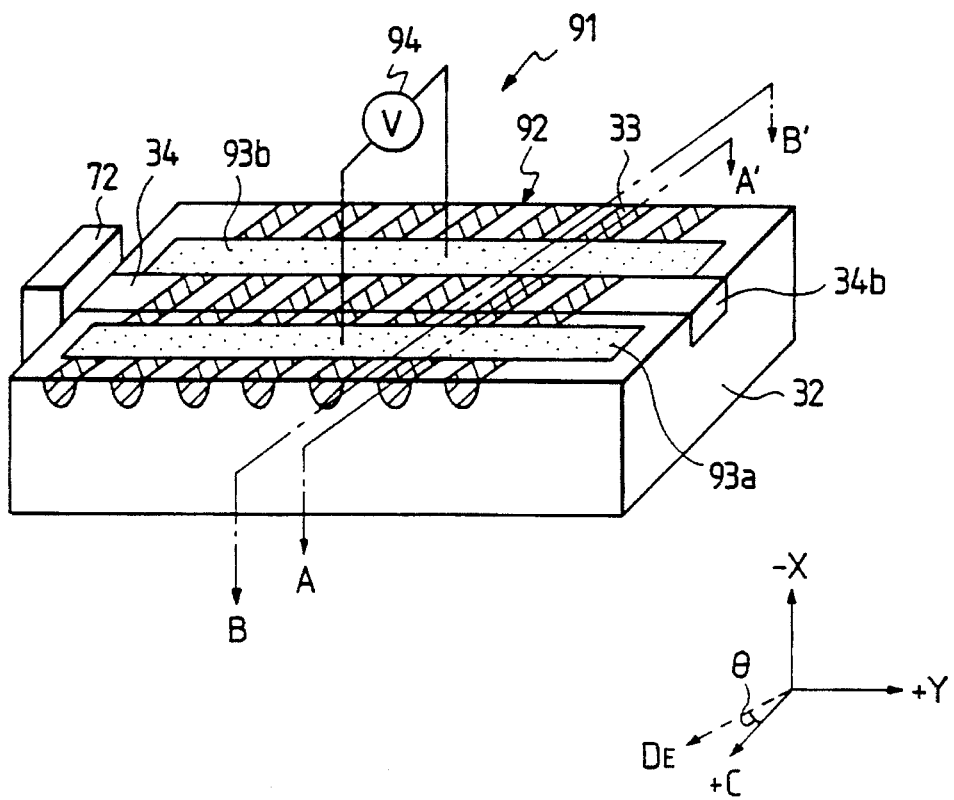
FIG. 31 is a diagonal view of a shorter wavelength coherent light generating apparatus according to an eighth embodiment of the present invention.
Figure 32A:
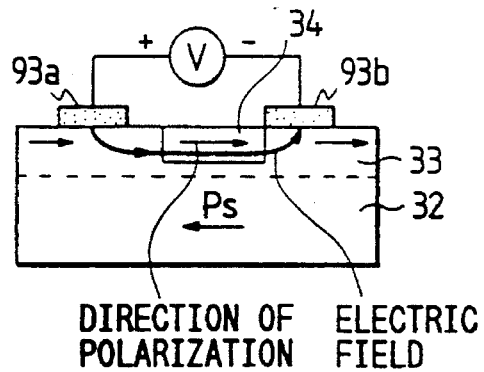
FIG. 32A is an enlarged cross-sectional view taken along lines A–A' of FIG. 31, showing electric field penetrating though an optical waveguide in the same direction as a direction of an inverted polarization.
Figure 32B:
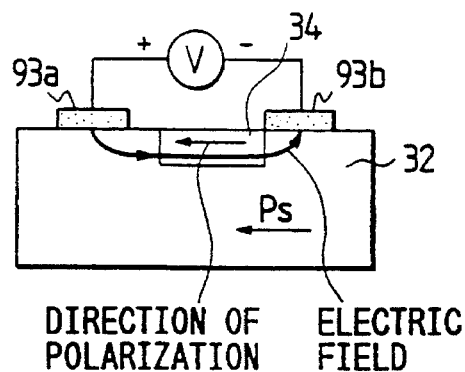
FIG. 32B is an enlarged cross-sectional view taken along lines B–B' of FIG. 31, showing electric field penetrating though an optical waveguide in an opposite direction to a direction of a spontaneous polarization Ps.

In an eighth embodiment, a wavelength of coherent light radiated from a semiconductor laser is fix by a diffraction grating which is formed in the optical waveguide 34 according to an electro-optic effect by inducing electric field in the optical waveguide FIG. 31 is a diagonal view of a shorter wavelength coherent light generating apparatus according to an eighth embodiment of the present invention. FIG. 32A is an enlarged cross-sectional view taken along lines A–A' of FIG. 31, showing electric field penetrating though the optical waveguide 34 in the same direction as the direction of the inverted polarization. FIG. 32B is an enlarged cross-sectional view taken along lines B–B' of FIG. 31, showing electric field penetrating though the optical waveguide 34 in an opposite direction to the direction of the spontaneous polarization Ps.

As shown in FIG. 31, a shorter wavelength coherent light generating apparatus 91 comprises the semiconductor laser 72 and an optical wavelength converting device 92 for reflecting coherent light radiated from the semiconductor laser 72 to fix a wavelength $\lambda_f$ of the coherent light and converting fundamental waves of the coherent light into second harmonic waves. The optical wavelength converting device 92 comprises the LiTaO₃ substrate 32, the inverted-polarization layers 33, the optical waveguide 34, a first electrode 93a which is arranged on the LiTaO₃ substrate 32 and the inverted-polarization layers 33 positioned in the +C-crystal axis direction to the optical waveguide 34 and is charged with positive electricity, a second electrode 93b which is arranged on the LiTaO₃ substrate 32 and the inverted-polarization layers 33 positioned in the –C-crystal axis direction to the optical waveguide 34 and is charged with negative electricity, and an electric source 94 for applying a positive electric potential to the first electrode 93a and applying a negative electric potential to the second electrode 93b. The regular intervals Λ of the inverted polarization layers 33 is 2 μm. The optical wave guide 34 has a width of 4 μm and a depth of a 1.9 μm.

In the above configuration, when the first electrode 93a is charged with positive electricity and the second electrode 98b is charged with negative electricity, as shown in FIGS. 32A, 32B, electric field directed in the –C-crystal axis direction is induced in the optical waveguide 34 consisting the inverted-polarization layers 33 and the non-inverted polarization layers 35. As a result, the refractive index of the inverted-polarization layers 33 increases by a value Δn (Δn>0) according to an electro-optic effect, and the refractive index of the non-inverted polarization layers 35 decreases by the value Δn.

Figure 33:
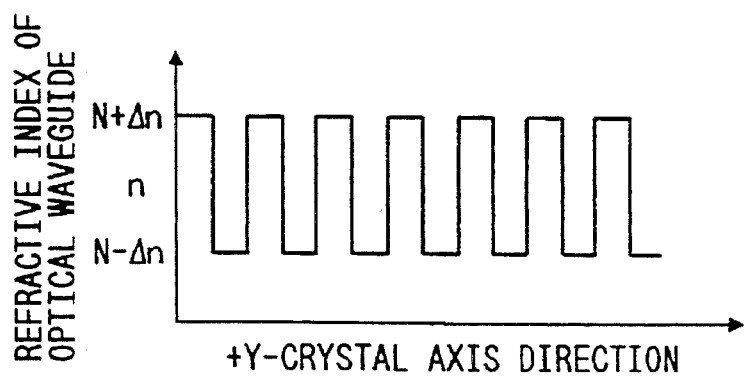
FIG. 33 graphically shows alternate changes of a refractive index in an optical waveguide shown in FIG. 31.

The electro-optic effect is defined as a phenomenon in which a refractive index of a crystal material is changed by electric field in dependence on an electro-optic constant. For example, in cases where the direction of the electric field is the same as that of polarization of the crystal material, the refractive index of the crystal material increases. In contrast, in cases where the direction of the electric field is opposite to that of the polarization of the crystal material, the refractive index of the crystal material decreases. Also, the degree of the change of the refractive index is proportional to the intensity of the electric field and the value of the electric-optic constant. The electro-optic constant in the C-crystal axis direction is large. Therefore, the increase or decrease of the refractive index in the inverted-polarization layers 33 is the reverse of that in the non-inverted polarization layers 35 because the polarization directions of the layers 33, 35 are opposite to each other. As a result, as shown in FIG. 33, the refractive index of the optical waveguide 34 periodically changes because the refractive index of the inverted-polarization layers 33 varies by the value an and the refractive index of the non-inverted polarization layers 35 varies by the value –Δn. In other words, a diffraction grating is formed in the optical waveguide 34.

Figure 34:
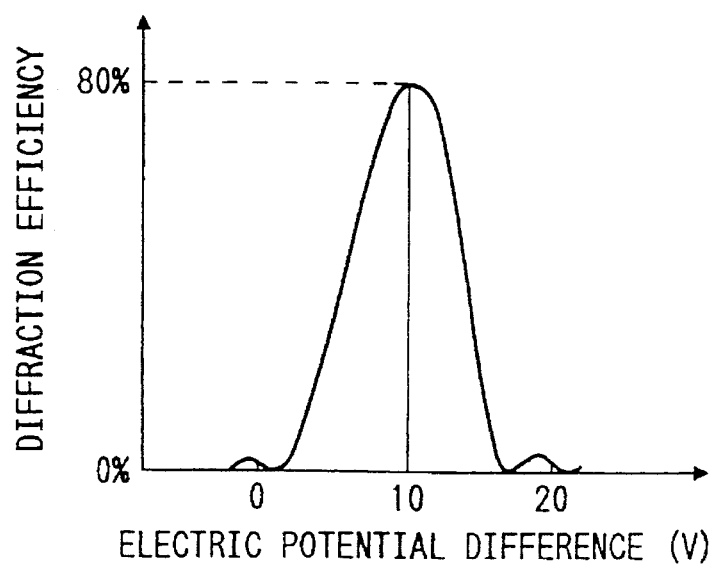
FIG. 34 graphically shows a relationship between an electric potential difference applied to electrodes and a diffraction efficiency of a diffraction grating formed in an optical waveguide shown in FIG. 31.

Optical characteristics of the diffraction grating formed in the optical waveguide 34 are described with reference to FIG. 34.

When coherent light having a wavelength of 860 nm is radiated from the semiconductor laser 72 to the optical waveguide 34, the coherent light is reflected by the diffraction grating at a diffraction efficiency because the DBR condition Λ=10*λ/(2N) is satisfied. Where the symbol N is an average refractive index of the optical waveguide 34. The diffraction efficiency is defined as a ratio of the intensity of coherent light transmitting through the optical waveguide 34 to the intensity of coherent light reflected by the diffraction grating. As shown in FIG. 34, when an electric potential difference between the first and second electrodes 93a, 93b is set to 10 V, the diffraction efficiency is 80%. In contrast, when the electric potential difference is set to 20 V, the diffraction efficiency is reduced to almost 0% because the average refractive index of the optical waveguide 34 is changed.

Accordingly, the second harmonic waves can be stably obtained in the shorter wavelength coherent light generating apparatus 91 regardless of the fluctuation of the ambient temperature or the injecting current to the semiconductor laser 72.

(Ninth Embodiment)

In a ninth embodiment, a wavelength of coherent light radiated from a semiconductor laser is fix by a diffraction grating which is formed in the optical waveguide 44 according to the electro-optic effect by inducing electric field in the optical waveguide 44.

Figure 35:
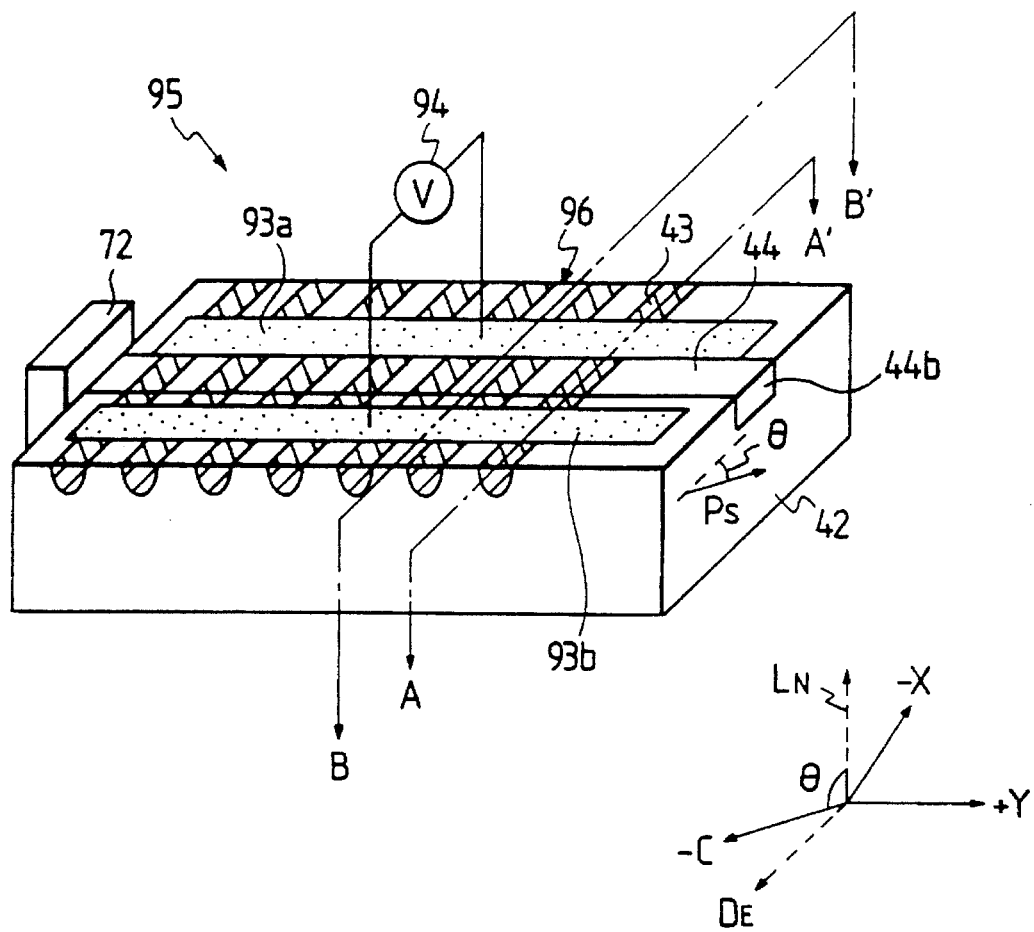
FIG. 35 is a diagonal view of a shorter wavelength coherent light generating apparatus according to a ninth embodiment of the present invention.
Figure 36A:
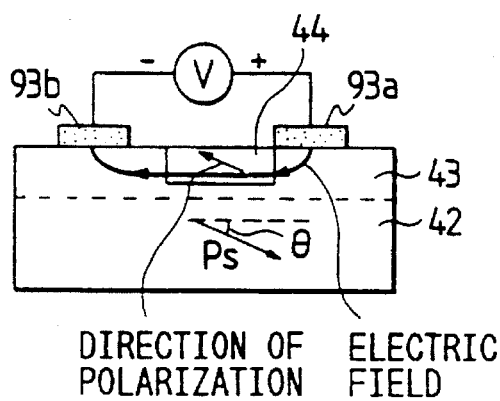
FIG. 36A is an enlarged cross-sectional view taken along lines A–A' of FIG. 35, showing electric field penetrating though an optical waveguide in the same direction as a direction of an inverted polarization.

FIG. 35 is a diagonal view of a shorter wavelength coherent light generating apparatus according to a ninth embodiment of the present invention. FIG. 36A is an enlarged cross-sectional view taken along lines A–A' of FIG. 35, showing electric field penetrating though the optical waveguide 44 in the same direction as the direction of the inverted polarization. FIG. 86B is an enlarged cross-sectional view taken along lines B–B' of FIG. 35, showing electric field penetrating though the optical waveguide 44 in an opposite direction to the direction of the spontaneous polarization Ps.

As shown in FIG. 35, a shorter wavelength coherent light generating apparatus 95 comprises the semiconductor laser 72 and an optical wavelength converting device 96 for reflecting coherent light radiated from the semiconductor laser 72 to fix a wavelength $\lambda_f$ of the coherent light and converting fundamental waves of the coherent light into second harmonic waves. The optical wavelength converting device 96 comprises the LiTaO₃ substrate 42, the inverted-polarization layers 43, the optical waveguide 44, the first electrode 93a which is arranged on the LiTaO₃ substrate 42 and the inverted-polarization layers 43 positioned in the +C-crystal axis direction to the optical waveguide 44 and is charged with positive electricity, the second electrode 93b which is arranged on the LiTaO₃ substrate 42 and the inverted-polarization layers 43 positioned in the −C-crystal axis direction to the optical waveguide 44 and is charged with negative electricity, and the electric source 94. The regular intervals Λπ of the inverted polarization layers 43 is 2 μm. The optical wave guide 44 has a width of 4 μm and a depth of a 1.9 μm.

Figure 36B:
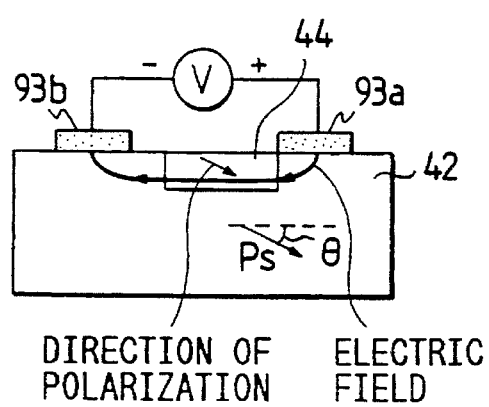
FIG. 36B is an enlarged cross-sectional view taken along lines B–B' of FIG. 35, showing electric field penetrating though an optical waveguide in an opposite direction to a direction of a spontaneous polarization Ps.

In the above configuration, when the first electrode 93a is charged with positive electricity and the second electrode 93b is charged with negative electricity, as shown in FIGS. 36A, 36B, electric field directed in the −C-crystal axis direction is induced in the optical waveguide 44 consisting of the inverted-polarization layers 43 and the non-inverted polarization layers 35. As a result, the refractive index of the inverted-polarization layers 43 increases by a value Δn (Δn>0) according to the electro-optic effect, and the refractive index of the non-inverted polarization layers 45 decreases by the value Δn.

Accordingly, the second harmonic waves can be stably obtained in the shorter wavelength coherent light generating apparatus 95 regardless of the fluctuation of the ambient temperature or the injecting current to the semiconductor laser 72, in the same manner as in the eighth embodiment.

(Tenth Embodiment)

Figure 37:
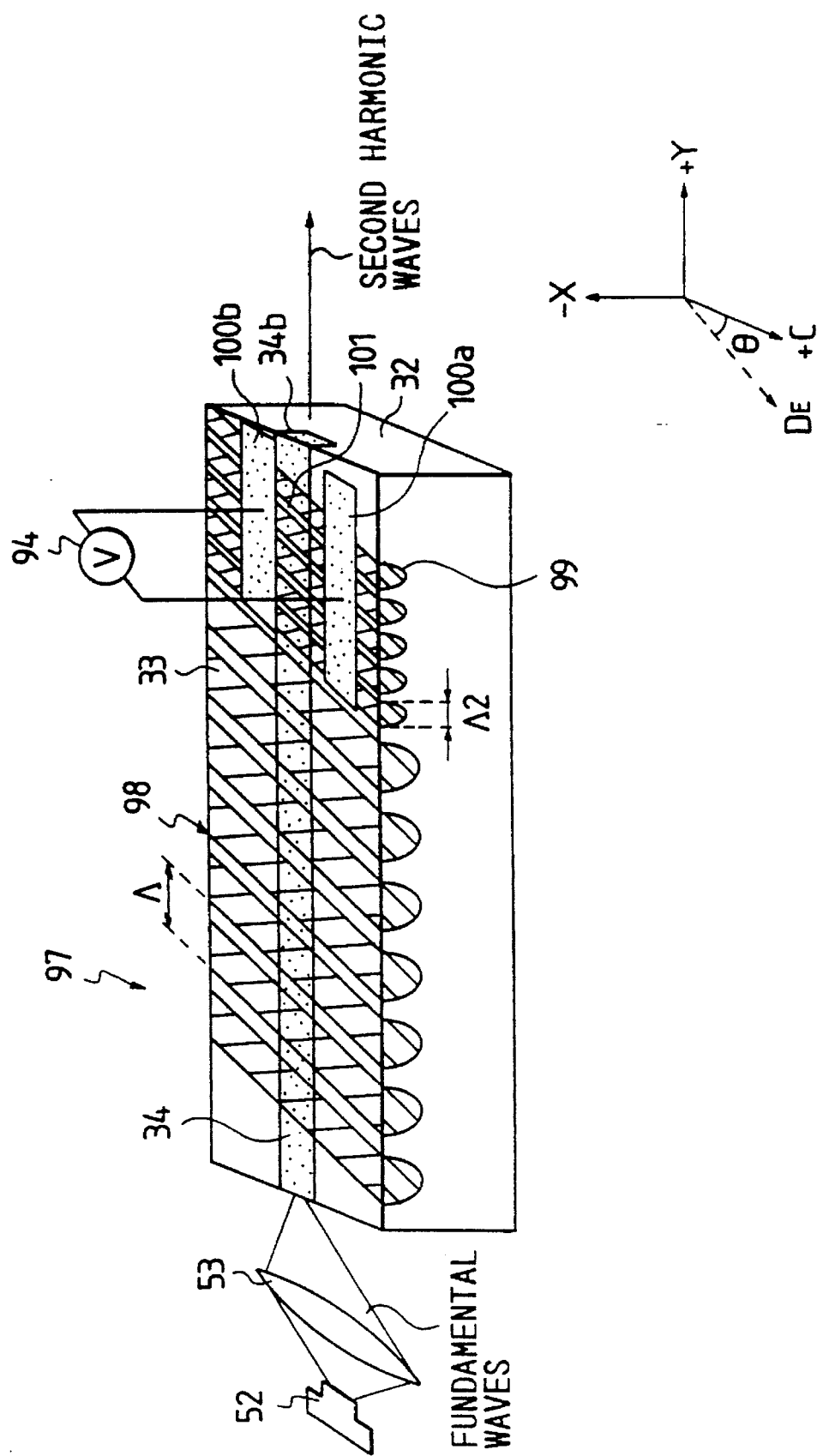
FIG. 37 is a diagonal view of a shorter wavelength coherent light generating apparatus according to a tenth embodiment of the present invention.

FIG. 37 is a diagonal view of a shorter wavelength coherent light generating apparatus according to a tenth embodiment off the present invention.

As shown in FIG. 37, a shorter wavelength coherent light generating apparatus 97 comprises the semiconductor laser 52, the coherent light converging system 53, and an optical wavelength converting device 98 for reflecting coherent light radiated from the semiconductor laser 52 to fix a wavelength $\lambda_f$ of the coherent light and converting fundamental waves of the coherent light into second harmonic waves. The optical wavelength converting device 98 comprises the LiTaO₃ substrate 32, the inverted-polarization layers 33, the optical waveguide 34, a series of second inverted-polarization layers 99 arranged in the neighborhood of the output end facet 34b in parallel to the inverted-polarization layers 33, a first electrode 100a which is arranged on the LiTaO₃ substrate 32 and the inverted-polarization layers 99 positioned in the +C-crystal axis direction to the optical waveguide 34 and is charged with positive electricity, a second electrode 100b which is arranged on the LiTaO₃ substrate 32 and the inverted-polarization layers 99 positioned in the −C-crystal axis direction to the optical waveguide 34 and is charged with negative electricity, and the electric source 94 for applying a positive electric potential to the first electrode 100a and applying a negative electric potential to the second electrode 100b.

The regular intervals Λ of the inverted polarization layers 33 is 4 μm. Therefore, the quasi-phase-matching condition is satisfied when coherent light having a wavelength of 870 nm transmits through the optical waveguide 34. Second regular intervals Λ2 of the inverted polarization layers 99 is 2 μm. The optical wave guide 34 has a width of 4 μm, a depth of a 1.9 μm, and a length of 15 mm. A length of the electrodes 100a, 100b in the Y-crystal axis direction is 5 mm.

In the above configuration, coherent light having an oscillating wavelength $\lambda_f$ is radiated from the semiconductor laser 52 and is incident on the incident end facet 34a of the optical waveguide 34 through the converging system 53. In the optical wavelength converting device 98, the first and second electrodes 100a, 100b are charged to set an electric potential difference between the electrodes 100a, 100b. Therefore, electric field directed in the −C-crystal axis direction is induced in the optical waveguide 34 positioned in the neighborhood of the output end facet 34b. As a result, the refractive index of the inverted-polarization layers 99 increases by a value Δn (Δn>0) according to the electro-optic effect, and the refractive index of second non-inverted polarization layers 101 arranged between the inverted-polarization layers 99 decreases by the value Δn. Therefore, the coherent light transmitting through the optical waveguide 34 is reflected by a diffraction grating which is formed in the optical waveguide 34 positioned in the neighborhood of the output end facet 34b. Thereafter, the coherent light reflected is returned to the semiconductor laser 52 to fix the oscillating wavelength $\lambda_f$.

For example, when the electric potential difference set to the electrodes 100a, 100b is 5 V, the DBR condition $\Lambda 2=10*\lambda_f/(2N)$ is satisfied for the coherent light having the wavelength $\lambda_f$ of 870 nm. In this case, a reflection efficiency of the diffraction grating is 30%, and 10% of the coherent light radiated from the semiconductor laser 52 is returned to the semiconductor laser 52. Because an oscillating wavelength of the coherent light radiated from the semiconductor laser 52 is 858 nm when an output power of the coherent light is 100 mW at a room temperature, the oscillating wavelength changes to 870 nm by the function of the diffraction grating to satisfy the quasi-phase-matching condition and the DBR condition.

Thereafter, the coherent light of which the wavelength is set is radiated from the semiconductor laser 52 to the optical waveguide 34, and fundamental waves of the coherent light are converted into second harmonic waves. The second harmonic waves are output from the output end facet 34b of the optical waveguide 34 at an outgoing power of 10 mW. In this case, a conversion efficiency is 15%.

Next, the stabilization of the intensity of the second harmonic waves is described.

When the temperature of the semiconductor laser is changed in a range from 10° C. to 50° C., the fluctuation of the intensity of the second harmonic waves is restrained within 5%. Also, when the injecting current supplied to the semiconductor laser 52 is changed, the oscillating wavelength of the coherent light remains fixed to 870 nm.

Accordingly, because the wavelength of the coherent light reflected by the diffraction grating can be adjusted by changing the electric potential difference between the electrodes 100a, 100b, the quasi-phase-matching condition and the DBR condition can be easily satisfied together. Therefore, the second harmonic waves can be stably output at high efficiency.

Next, modulation of the second harmonic waves is described.

In cases where the electric potential difference is set to zero, any fundamental wave is not reflected. Therefore, when coherent light having an oscillating wavelength of 868 nm is dominantly radiated to the optical waveguide 34, the outgoing power of the second harmonic waves is considerably decreased to 0.01 mV because the quasi-phase-matching condition is not satisfied. In cases where the electric potential difference is set to 5 V, coherent light of an oscillating wavelength $\lambda_f$=870 nm rarely radiated to the optical waveguide 34 is selectively reflected by the diffraction grating. Therefore, an oscillating wavelength of the coherent light radiated from the semiconductor laser 52 is fixed to 870 nm. In this case, the second harmonic waves are output at the outgoing power of 10 mW.

Accordingly, the outgoing power of the second harmonic waves can be modulated by periodically changing the electric potential difference in a range from 0 V to 5 V. For example, the outgoing power of the second harmonic waves can be modulated at a frequency of 100 MHz, and a ratio of signal/noise (S/N) is 25 dB. The modulated second harmonic waves is utilized to write information in an optical disk.

In the tenth embodiment, the shorter wavelength coherent light generating apparatus 97 is manufactured by utilizing the optical wavelength converting device 31 according to the first embodiment. However, the concept of the invention described in the tenth embodiment is not limited to the first embodiment. That is, it is available that the shorter wavelength coherent light generating apparatus 97 be manufactured by utilizing the optical wavelength converting device 41 according to the second embodiment.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An optical wavelength converting device, comprising:

a ferroelectric substrate having an upper surface of which a normal line is inclined to a C-crystal axis toward an X-Y crystalline plane defined as (001) crystalline plane in Miller indices, spontaneous polarization of the ferroelectric substrate being directed toward a +C-crystal axis direction of the C-crystal axis;

a plurality of inverted-polarization layers arranged at regular intervals in an upper surface region of the ferroelectric substrate, polarization of the inverted-polarization layers being directed toward a –C-crystal axis direction of the C-crystal axis, and the inverted-polarization layers being formed by exchanging positive ions included in the ferroelectric substrate for H$^+$ ions; and an optical waveguide crossing alternate rows of the inverted-polarization layers and the ferroelectric substrate positioned between the inverted-polarization layers, a part of fundamental waves transmitting through the optical waveguide being convened into second harmonic waves, and a refractive index of the optical waveguide being higher than that of the ferroelectric substrate to confine the fundamental and second harmonic waves in the optical waveguide.

2. A device according to claim 1 in which the normal line of the upper surface of the ferroelectric substrate is inclined at an angle of 90 degrees to the C-crystal axis toward the X-Y crystalline plane, and an extending direction of each of the inverted-polarization layers is inclined at an angle of six degrees or more to the C-crystal axis.

3. A device according to claim 2 in which the extending direction of each of the inverted-polarization layers is inclined at an angle ranging from 6 degrees to 174 degrees to the C-crystal axis, and the optical waveguide extends in a coherent light transmitting direction perpendicular to the C-crystal axis.

4. A device according to claim 1 in which a rising direction of the normal line of the upper surface of the ferroelectric substrate is inclined at an angle ranging from 60 degrees to 85 degrees to a –C-crystal axis direction.

5. A device according to claim 4 in which an extending direction of each of the inverted-polarization layers is reclined at an angle ranging from 6 degrees to 174 degrees to an X-C crystalline plane defined as (010) crystalline plane in the Miller indices, and the optical waveguide extends in a coherent light transmitting direction perpendicular to the C-crystal axis.

6. A device according to claim 4 in which an extending direction of each of the inverted-polarization layers is parallel to an X-C crystalline plane defined as (010) crystalline plane in the Miller indices, and the optical waveguide extends in a coherent light transmitting direction perpendicular to the C-crystal axis.

7. A device according to claim 1 in which a difference in a refractive index between the inverted-polarization layers and the ferroelectric substrate positioned in the optical waveguide is 0.005 or less to prevent a transmission loss of the fundamental and second harmonic waves transmitting through the optical waveguide from being increased.

8. A device according to claim 1 in which a width of each of the inverted-polarization layers ranges from 1 μm to 10 μm.

9. A device according to claim 1 in which the regular intervals of the inverted-polarization layers are respectively set to an equal distance ranging from 3 μm to 5 μm to obtain blue light consisting of the second harmonic waves on condition that a quasi-phase-matching condition $\Lambda=\lambda_f/\{2*(N2\omega-N\omega)\}$ is satisfied, where the symbol $\Lambda$ denotes the regular intervals, the symbol $\lambda_f$ denotes a wavelength of the fundamental waves, the symbol $N2\omega$ denotes an effective refractive index of the optical waveguide for the second harmonic waves, and the symbol $N\omega$ denotes an effective refractive index of the optical waveguide for the fundamental waves.

10. A device according to claim 1 in which the ferroelectric substrate is made of ferroelectric substance selected from the group consisting of: pure LiTaO$_3$ crystal; LiTaO$_3$ crystal doped by any of MgO, Nb, or Nd; pure LiNbO$_3$ crystal; and LiNbO$_3$ crystal doped by any of MgO, Ta, or Nd.

11. A device according to claim 1 in which each of the inverted-polarization layers is formed in a stripe shape.

12. A device according to claim 1, additionally including:

a plurality of gratings periodically arranged on the optical waveguide at grating intervals in parallel to the inverted-polarization layers, a first refractive index of the gratings being equal to N1; and a covering layer arranged between the gratings to produce a periodic structure, a second refractive index of the covering layer being equal to N2 which differs from the first refractive index N1 of the gratings to form a diffraction grating in the periodic structure, and the fundamental waves which are not converted into the second harmonic waves being reflected by the diffraction grating.

13. A device according to claim 1, additionally including:

a first electrode arranged on the ferroelectric substrate and the inverted-polarization layers positioned in the +C-crystal axis direction to the optical waveguide;

a second electrode arranged on the ferroelectric substrate and the inverted-polarization layers positioned in the −C-crystal axis direction to the optical waveguide; and an electric source for applying an electric potential difference between the first and second electrodes, the electric field being induced through the optical waveguide between the first and second electrodes to change a first refractive index of the inverted-polarization layers in the optical waveguide and a second refractive index of the ferroelectric substrate in the optical waveguide, an increase or decrease of the first refractive index being opposite to that of the second refractive index to produce a diffraction grating formed of periodic change of the first and second refractive indexes in the optical waveguide, and the fundamental waves which are not converted into the second harmonic waves being reflected by the diffraction grating.

14. A device according to claim 1, additionally including:

a plurality of second invented-polarization layers arranged in parallel to the inverted-polarization layers at second regular intervals to cross the optical waveguide, polarization of the second inverted-polarization layers being directed toward the −C-crystal axis direction, and the second inverted-polarization layers being formed by exchanging positive ions included in the ferroelectric substrate for $H^+$ ions; and a first electrode arranged on the ferroelectric substrate and the second inverted-polarization layers positioned in the +C-crystal axis direction to the optical waveguide;

a second electrode arranged on the ferroelectric substrate and the second inverted-polarization layers positioned in the −C-crystal axis direction to the optical waveguide; and an electric source for applying an electric potential difference between the first and second electrodes, the electric field being induced through the optical waveguide between the first and second electrodes to change a first refractive index of the second inverted-polarization layers in the optical waveguide and a second refractive index of the ferroelectric substrate in the optical waveguide, an increase or decrease of the first refractive index being opposite to that of the second refractive index to produce a diffraction grating formed of periodic change of the first and second refractive indexes in the optical waveguide, and the fundamental waves which are not converted into the second harmonic waves being reflected by the diffraction grating.

15. A shorter wavelength coherent light generating apparatus, comprising:

a semiconductor laser for radiating coherent light consisting of fundamental waves: and an optical wavelength convening device for converting the fundamental waves radiated from the semiconductor laser into second harmonic waves of which a wavelength is half of that of the fundamental waves, comprising a ferroelectric substrate having an upper surface of which a normal line is inclined to a C-crystal axis toward an X-Y crystalline plane defined as (001) crystalline plane in Miller indices, spontaneous polarization of the ferroelectric substrate being directed toward a +C-crystal axis direction of the C-crystal axis, a plurality of inverted-polarization layers arranged at regular intervals in an upper surface region of the ferroelectric substrate, polarization of the inverted-polarization layers being directed toward a −C-crystal axis direction of the C-crystal axis, and the inverted-polarization layers being formed by exchanging positive ions included in the ferroelectric substrate for $H^+$ ions, and an optical waveguide crossing alternate rows of the inverted-polarization layers and the ferroelectric substrate positioned between the inverted-polarization layers, a refractive index of the optical waveguide being higher than that of the ferroelectric substrate to confine the fundamental waves radiated from the semiconductor laser, and the fundamental waves being converted into second harmonic waves in the alternate rows of the optical waveguide.

16. An apparatus according to claim 15 in which the normal line of the upper surface of the ferroelectric substrate is inclined at an angle of 90 degrees to the C-crystal axis toward the X-Y crystalline plane, and an extending direction of each of the inverted-polarization layers is inclined at an angle of six degrees or more to the C-crystal axis.

17. An apparatus according to claim 16 in which the extending direction of each of the inverted-polarization layers is inclined at an angle ranging from 6 degrees to 174 degrees to the C-crystal axis, and the optical waveguide extends in a coherent light transmitting direction perpendicular to the C-crystal axis.

18. An apparatus according to claim 15 in which a rising direction of the normal line of the upper surface of the ferroelectric substrate is inclined at an angle ranging from 60 degrees to 85 degrees to a −C-crystal axis direction.

19. An apparatus according to claim 18 in which an extending direction of each of the inverted-polarization layers is inclined at an angle ranging from 6 degrees to 174 degrees to an X-C crystalline plane defined as (010) crystalline plane in the Miller indices, and the optical waveguide extends in a coherent light transmitting direction perpendicular to the C-crystal axis.

20. An apparatus according to claim 18 in which an extending direction of each of the inverted-polarization layers is parallel to an X-C crystalline plane defined as (010) crystalline plane in the Miller indices, and the optical waveguide extends in a coherent light transmitting direction perpendicular to the C-crystal axis.

21. An apparatus according to claim 15 in which a difference in a refractive index between the inverted-polarization layers and the ferroelectric substrate positioned in the optical waveguide is 0.005 or less to prevent a transmission loss of the fundamental and second harmonic waves transmitting through the optical waveguide from being increased.

22. An apparatus according to claim 15 in which a width of each of the inverted-polarization layers range from 1 μm to 10 μm.

23. An apparatus according to claim 15 in which the regular intervals of the inverted-polarization layers are respectively set to an equal distance ranging from 3 μm to 5 μm to obtain blue light consisting of the second harmonic waves on condition that a quasi-phase-matching condition $\Lambda=\lambda_f/\{2*(N2\omega-N\omega)\}$ is satisfied, where the symbol $\Lambda$ denotes the regular intervals, the symbol $\lambda_f$ denotes a wavelength of the fundamental waves, the symbol $N2\omega$ denotes an effective refractive index of the optical waveguide for the second harmonic waves, and the symbol $N\omega$ denotes an effective refractive index of the optical waveguide for the fundamental waves.

24. An apparatus according to claim 15 in which the ferroelectric substrate is made of ferroelectric substance selected from the group consisting of: pure $LiTaO_3$ crystal;

LiTaO$_3$ crystal doped by any of MgO, Nb, or Nd; pure LiNbO$_3$ crystal; and LiNbO$_3$ crystal doped by any of MgO, Ta, or Nd.

25. An apparatus according to claim 15 in which each of the inverted-polarization layers is formed in a stripe shape.

26. An apparatus according to claim 15, the optical wavelength converting device additionally including:

a plurality of gratings periodically arranged on the optical waveguide at grating intervals in parallel to the inverted-polarization layers, a first refractive index of the gratings being equal to N1; and a covering layer arranged between the gratings to produce a periodic structure, a second refractive index of the covering layer being equal to N2 which differs from the first refractive index N1 of the gratings to form a diffraction grating in the periodic structure, the coherent light of a particular wavelength being selectively reflected by the diffraction grating, and the coherent light reflected being returned to the semiconductor laser to fix the wavelength of the coherent light radiated from the semiconductor laser to the particular wavelength.

27. An apparatus according to claim 15, the optical wavelength converting device additionally including:

a first electrode arranged on the ferroelectric substrate and the inverted-polarization layers positioned in the +C-crystal axis direction to the optical waveguide;

a second electrode arranged on the ferroelectric substrate and the inverted-polarization layers positioned in the −C-crystal axis direction to the optical waveguide; and an electric source for applying an electric potential difference between the first and second electrodes to induce electric field through the optical waveguide between the first and second electrodes, a first refractive index of the inverted-polarization layers in the optical waveguide and a second refractive index of the ferroelectric substrate in the optical waveguide being changed according to intensity of the electric field on condition that increase or decrease of the first refractive index is opposite to that of the second refractive index to produce a diffraction grating formed of alternate changes of the first and second refractive indexes in the optical waveguide, the coherent light of a particular wavelength being selectively reflected by the diffraction grating, and the coherent light reflected being returned to the semiconductor laser to fix the wavelength of the coherent light radiated from the semiconductor laser to the particular wavelength.

28. An apparatus according to claim 15 in which the semiconductor laser is directly attached to an incident end facet of the optical waveguide to transmit the coherent light polarized in a transverse electric mode through the optical waveguide.

29. An apparatus according to claim 15, additionally including an optical system for converging the coherent light radiated from the semiconductor laser at an incident end facet of the optical waveguide while maintaining the coherent light polarized in a transverse electric mode.

30. An apparatus according to claim 15, the optical wavelength converting device additionally including:

a first electrode arranged on the ferroelectric substrate and the inverted-polarization layers positioned in the +C-crystal axis direction to the optical waveguide;

a second electrode arranged on the ferroelectric substrate and the inverted-polarization layers positioned in the −C-crystal axis direction to the optical waveguide; and an electric source for periodically applying an electric potential difference between the first and second electrodes to periodically induce electric field through the optical waveguide between the first and second electrodes, a first refractive index of the inverted-polarization layers in the optical waveguide and a second refractive index of the ferroelectric substrate in the optical waveguide being periodically changed according to intensity of the electric field periodically induced on condition that increase or decrease of the first refractive index is opposite to that of the second refractive index to produce a diffraction grating formed of alternate changes of the first and second refractive indexes in the optical waveguide, the coherent light of a particular wavelength being selectively and periodically reflected by the diffraction grating, the coherent light reflected being returned to the semiconductor laser to fix the wavelength of the coherent light radiated from the semiconductor laser to the particular wavelength, and the second fundamental waves of a second particular wavelength being periodically output from an output end facet of the optical waveguide.

31. An apparatus according to claim 15, the optical wavelength converting device additionally including:

a plurality of second inverted-polarization layers arranged in parallel to the inverted-polarization layers at second regular intervals to cross the optical waveguide, polarization of the second inverted-polarization layers being directed toward the −C-crystal axis direction, and the second inverted-polarization layers being formed by exchanging positive ions included in the ferroelectric substrate for H$^+$ ions; and a first electrode arranged on the ferroelectric substrate and the second inverted-polarization layers positioned in the +C-crystal axis direction to the optical waveguide;

a second electrode arranged on the ferroelectfic substrate and the second inverted-polarization layers positioned in the −C-crystal axis direction to the optical waveguide; and an electric source for applying an electric potential difference between the first and second electrodes to induce electric field through the optical waveguide between the first and second electrodes, a first refractive index of the second inverted-polarization layers in the optical waveguide and a second refractive index of the ferroelectric substrate in the optical waveguide being changed according to intensity of the electric field on condition that increase or decrease of the first refractive index is opposite to that of the second refractive index to produce a diffraction grating formed of alternate changes of the first and second refractive indexes in the optical waveguide, the coherent light of a particular wavelength being selectively reflected by the diffraction grating, and the coherent light reflected being returned to the semiconductor laser to fix the wavelength of the coherent light radiated from the semiconductor laser to the particular wavelength.

* * * * *

UNITED STATES PATENT AND TRADEMARK OFFICE
CERTIFICATE OF CORRECTION

PATENT NO. : 5,506,722
DATED : April 9, 1996
INVENTOR(S) : Kiminori Mizuuchi, et. al.

It is certified that error appears in the above-indentified patent and that said Letters Patent is hereby corrected as shown below:

On the title page, item [73] should read as follows:

--[73]  Assignee: Matsushita Electric Industrial Co., Ltd., Osaka, Japan--

Signed and Sealed this

Twenty-fourth Day of September, 1996

Attest:

BRUCE LEHMAN

*Attesting Officer*     *Commissioner of Patents and Trademarks*